US010407053B2

(12) United States Patent
Ruybal et al.

(10) Patent No.: US 10,407,053 B2
(45) Date of Patent: Sep. 10, 2019

(54) SYSTEMS AND METHODS FOR HYBRID VEHICLE LAUNCH

(71) Applicant: Ford Global Technologies, LLC, Dearborn, MI (US)

(72) Inventors: Kevin Ray Ruybal, Canton, MI (US); Michael Glenn Fodor, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 59 days.

(21) Appl. No.: 15/890,757

(22) Filed: Feb. 7, 2018

(65) Prior Publication Data

US 2018/0244260 A1     Aug. 30, 2018

Related U.S. Application Data

(60) Provisional application No. 62/464,559, filed on Feb. 28, 2017.

(51) Int. Cl.

| | |
|---|---|
| *B60W 20/19* | (2016.01) |
| *B60W 10/02* | (2006.01) |
| *B60W 10/08* | (2006.01) |
| *B60W 30/18* | (2012.01) |
| *B60W 20/11* | (2016.01) |
| *B60W 50/00* | (2006.01) |

(52) U.S. Cl.
CPC ............ *B60W 20/19* (2016.01); *B60W 10/02* (2013.01); *B60W 10/08* (2013.01); *B60W 20/11* (2016.01); *B60W 30/18027* (2013.01); *B60W 2050/004* (2013.01); *B60W 2050/0041* (2013.01); *B60W 2510/0241* (2013.01); *B60W 2510/0638* (2013.01); *B60W 2510/083* (2013.01); *B60W 2510/1005* (2013.01); *B60W 2510/1015* (2013.01); *B60W 2710/027* (2013.01); *B60W 2710/083* (2013.01); *Y02T 10/6286* (2013.01); *Y02T 10/6295* (2013.01)

(58) Field of Classification Search
None
See application file for complete search history.

(56) References Cited

U.S. PATENT DOCUMENTS 5,993,350 A * 11/1999 Lawrie ............... B60K 6/40
                                                477/5
6,463,821 B1 * 10/2002 Reed, Jr. ............ F16D 21/06
                                                192/103 C (Continued)

*Primary Examiner* — Dirk Wright
(74) *Attorney, Agent, or Firm* — David Kelley; McCoy Russell LLP

(57) ABSTRACT

Methods and systems are provided for operating a vehicle driveline where the vehicle driveline does not include a torque converter. In one example, a method comprises controlling a capacity of a clutch configured to transmit torque between an engine and a transmission, and an output of an electric motor positioned in a driveline of the hybrid vehicle during a vehicle launch to emulate a performance of a torque converter positioned in the driveline of the vehicle. In this way, vehicle launch maneuvers may be conducted for vehicles that are equipped with a clutch and an electric motor, such that said launch maneuvers mimic those of a vehicle with a torque converter, which may improve customer satisfaction and improve engine efficiency.

20 Claims, 11 Drawing Sheets

(56) References Cited

U.S. PATENT DOCUMENTS

| | | | | |
|---|---|---|---|---|
| 7,090,617 B2 * | 8/2006 | Bassler | ............... | F16D 48/062 |
| | | | | 477/171 |
| 7,630,811 B2 * | 12/2009 | Jiang | ................... | B60W 10/02 |
| | | | | 192/48.8 |
| 7,752,021 B2 | 7/2010 | Holtz et al. | | |
| 7,998,026 B2 | 8/2011 | Fodor et al. | | |
| 8,260,513 B2 | 9/2012 | Shelton et al. | | |
| 8,469,858 B2 | 6/2013 | Yang et al. | | |
| 8,849,532 B2 * | 9/2014 | Burtch | ................ | F16D 48/066 |
| | | | | 477/174 |
| 9,039,570 B2 * | 5/2015 | Doering | ................. | B60K 6/48 |
| | | | | 477/86 |
| 9,090,240 B2 * | 7/2015 | Burtch | ................ | B60W 10/02 |
| 9,108,614 B2 * | 8/2015 | Doering | .............. | B60W 10/02 |
| 9,493,152 B2 * | 11/2016 | Doering | ................. | B60K 6/48 |
| 10,151,360 B2 * | 12/2018 | Kim | ..................... | F16D 48/08 |
| 2013/0282247 A1 * | 10/2013 | Burtch | ................ | F16D 48/062 |
| | | | | 701/67 |

\* cited by examiner

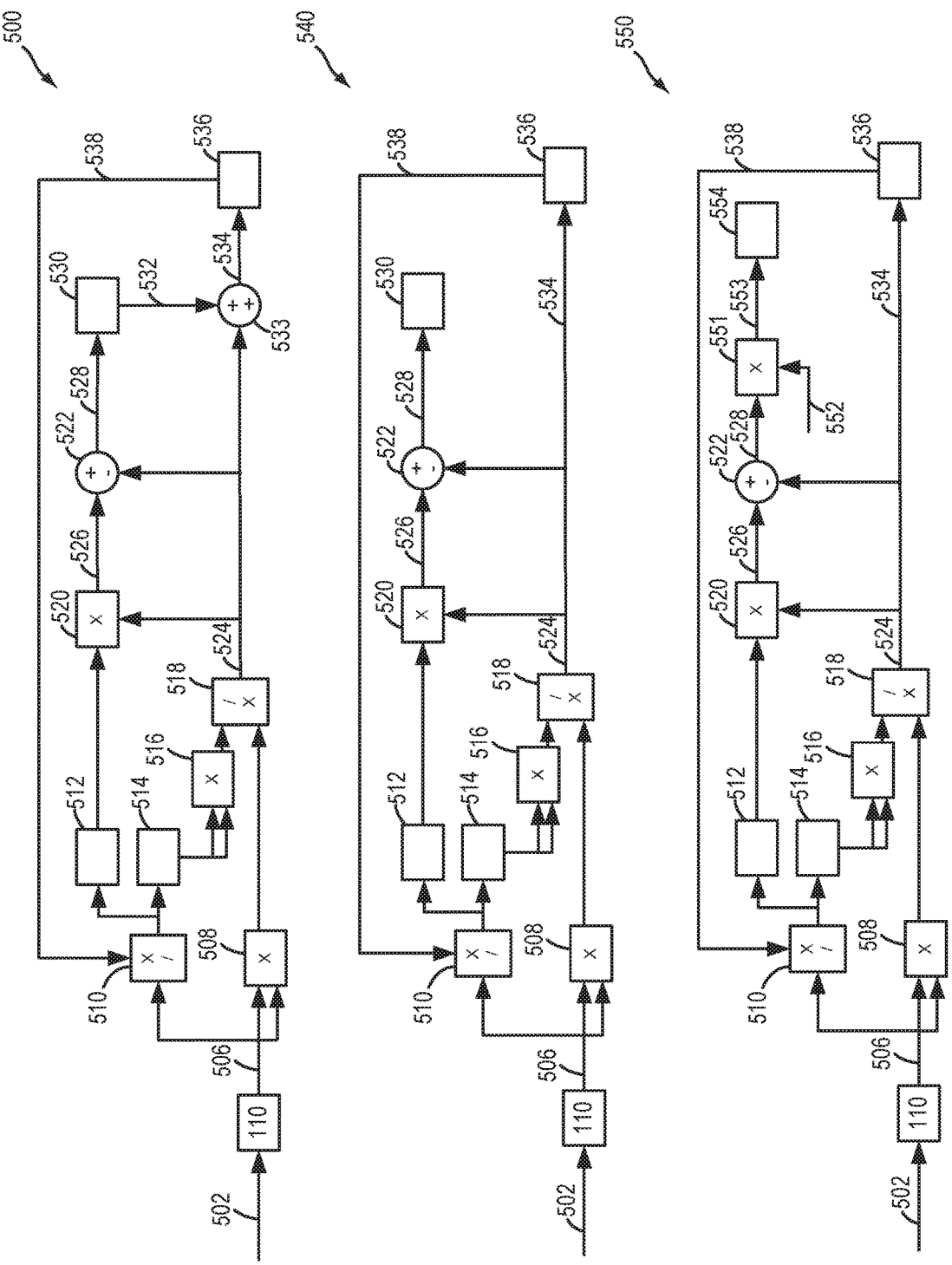

SYSTEMS AND METHODS FOR HYBRID VEHICLE LAUNCH

CROSS REFERENCE TO RELATED APPLICATION

The present application claims priority to U.S. Provisional Patent Application No. 62/464,559 entitled "SYSTEMS AND METHODS FOR HYBRID VEHICLE LAUNCH," filed on Feb. 28, 2017. The entire contents of the above-referenced application are hereby incorporated by reference in its entirety for all purposes.

FIELD

The present description relates generally to methods and systems for controlling a vehicle transmission input clutch and a drivetrain electric machine during a vehicle launch condition.

BACKGROUND/SUMMARY

A vehicle launch is a low-speed drive-away event in which a vehicle with a transmission is accelerated in response to the vehicle operator depressing an accelerator pedal. When the vehicle powertrain is equipped with a conventional automatic transmission, launch behavior is largely regulated by the torque converter, which ultimately sets engine speed and wheel torque as a dynamic function of engine torque. In such a setting, the torque converter characteristics are first engineered to trade off fuel economy and driving performance, then engine pedal maps (the engine control software relationship between accelerator pedal position and engine torque) are tuned to provide the best vehicle feel for the given converter design. The torque converter thus transmits available engine torque to the transmission to smoothly bring engine and transmission input speeds together while accelerating the vehicle mass.

An emerging trend in automatic transmission design eliminates the torque converter and replaces it with an automatically controlled clutch. Such transmissions provide a lower number of parts, simplicity and robust design, and much commonality with manual transmissions, potentially facilitating production. Such a change further enables the use of algorithms that can control the clutch in ways that may eliminate or reduce some of the design tradeoffs inherent in the passive torque converter system.

Vehicle operators may have expectations for vehicles without a torque converter to behave similar to what they are used to in vehicles with a torque converter. The inventors herein have recognized these issues, and have developed systems and methods to at least partially address the above issues. In one example, a method comprises controlling a capacity of a clutch configured to transmit torque between an engine and a transmission, and an output of an electric motor positioned in a driveline of the hybrid vehicle during a vehicle launch to emulate a performance of a torque converter positioned in the driveline of the hybrid vehicle, under conditions where the hybrid vehicle does not include the torque converter. In one example of the method, the transmission comprises a dual clutch transmission. In this way, vehicle operator expectations for vehicle launch behavior may be met for vehicles that do not include a torque converter, such as vehicles that include an electric motor in the vehicle driveline and at least a clutch configured to transmit torque from the engine to one or more wheels via the transmission.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5A shows a first block diagram for controlling a hybrid powertrain to emulate the performance of a vehicle with a torque converter during a vehicle launch procedure.

FIG. 5B shows a second block diagram for controlling a hybrid powertrain to emulate the performance of a vehicle with a torque converter during a vehicle launch procedure.

FIG. 5C shows a third block diagram for controlling a hybrid powertrain to emulate the performance of a vehicle with a torque converter during a vehicle launch procedure.

DETAILED DESCRIPTION

Figure 6:
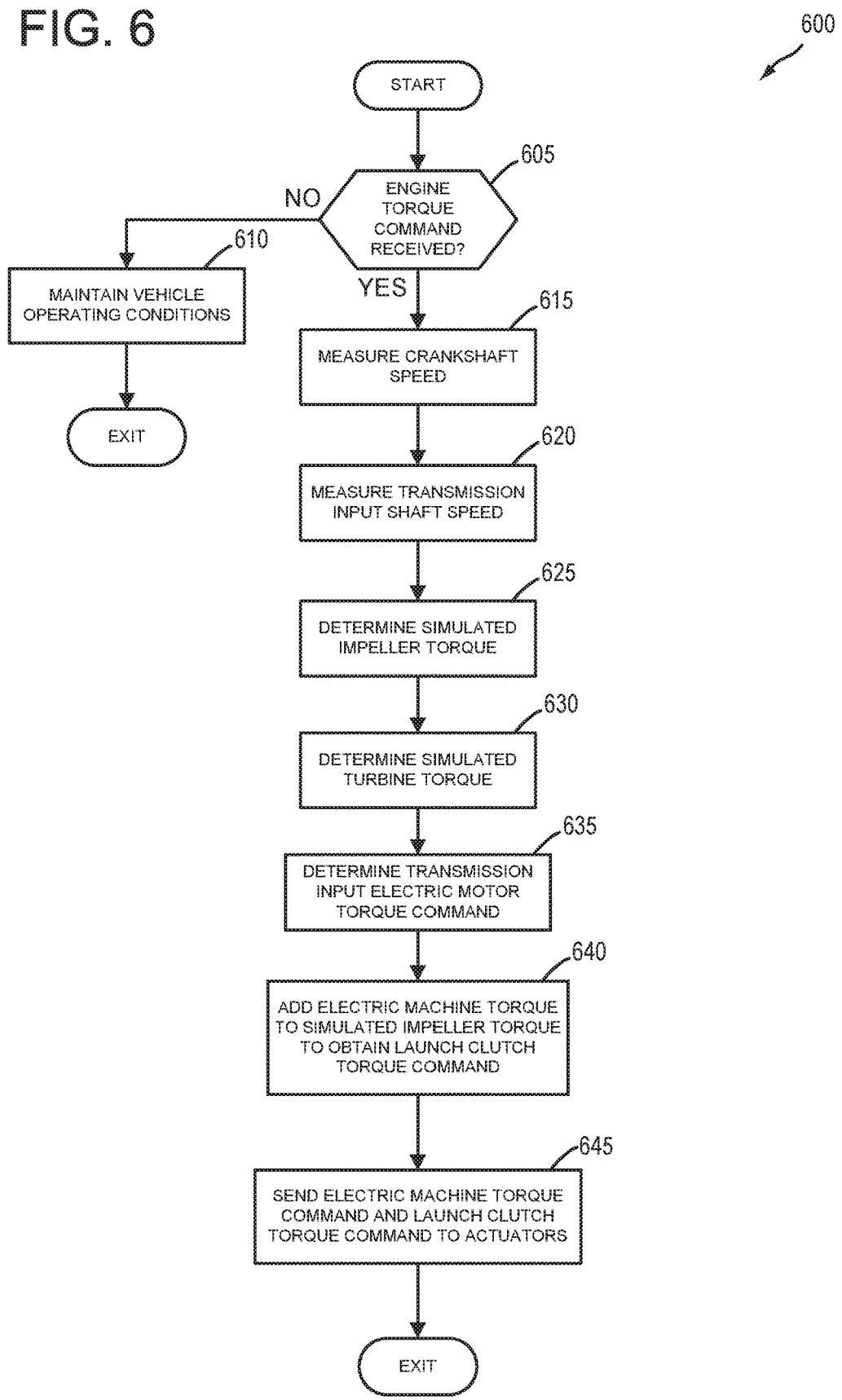
FIG. 6 shows an example method for controlling a hybrid powertrain to emulate the performance of a vehicle with a torque converter during a vehicle launch procedure, which may be utilized in conjunction with the block diagram depicted at FIG. 5A.
Figure 7:
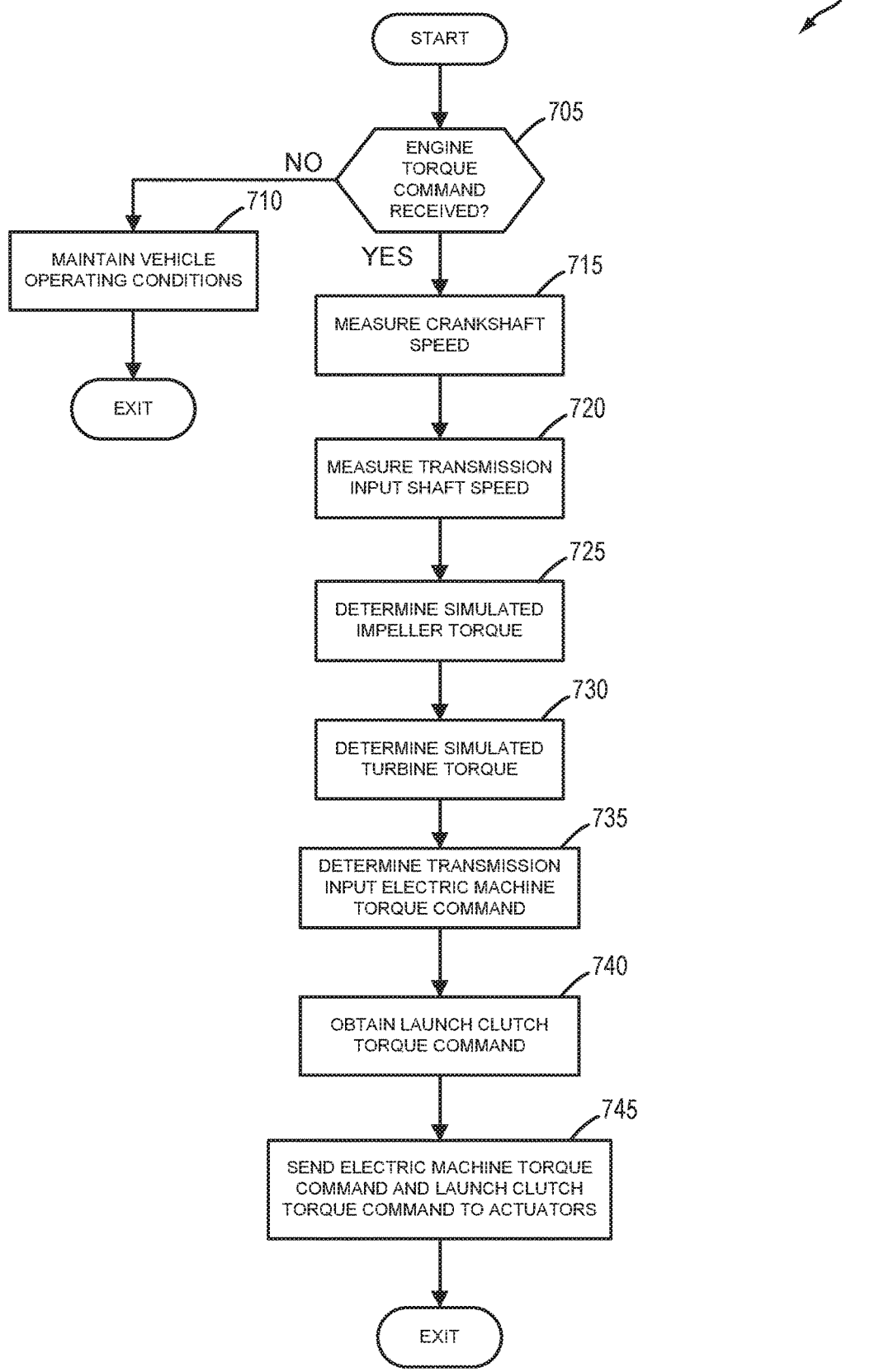
FIG. 7 shows an example method for controlling a hybrid powertrain to emulate the performance of a vehicle with a torque converter during a vehicle launch procedure, which may be utilized in conjunction with the block diagram depicted at FIG. 5B.

The following description relates to systems and methods for operating a driveline of a vehicle. FIGS. 1A-3 show an example hybrid vehicle driveling that includes an internal combustion engine, an integrated starter/generator, a dual clutch transmission, and an electric machine. FIG. 4A shows an example plot of a torque converter k-factor as a function of a ratio of turbine speed to impeller speed. FIG. 4B shows an example plot of a torque converter torque ratio as a function of a ratio of turbine speed to impeller speed. FIG. 5A shows a first block diagram for controlling a hybrid powertrain to emulate the performance of a vehicle with a torque converter during a vehicle launch procedure. FIG. 5B shows a second block diagram for controlling a hybrid powertrain to emulate the performance of a vehicle with a torque converter during a vehicle launch procedure. FIG. 5C shows a third block diagram for controlling a hybrid powertrain to emulate the performance of a vehicle with a torque converter during a vehicle launch procedure. FIG. 6 shows an example method for controlling a hybrid powertrain to emulate the performance of a vehicle with a torque converter during a vehicle launch procedure, which may be utilized in conjunction with the block diagram depicted at FIG. 5A. FIG. 7 shows an example method for controlling a hybrid powertrain to emulate the performance of a vehicle with a torque converter during a vehicle launch procedure, which may be utilized in conjunction with the block diagram depicted at FIG. 5B.

Figure 1A:
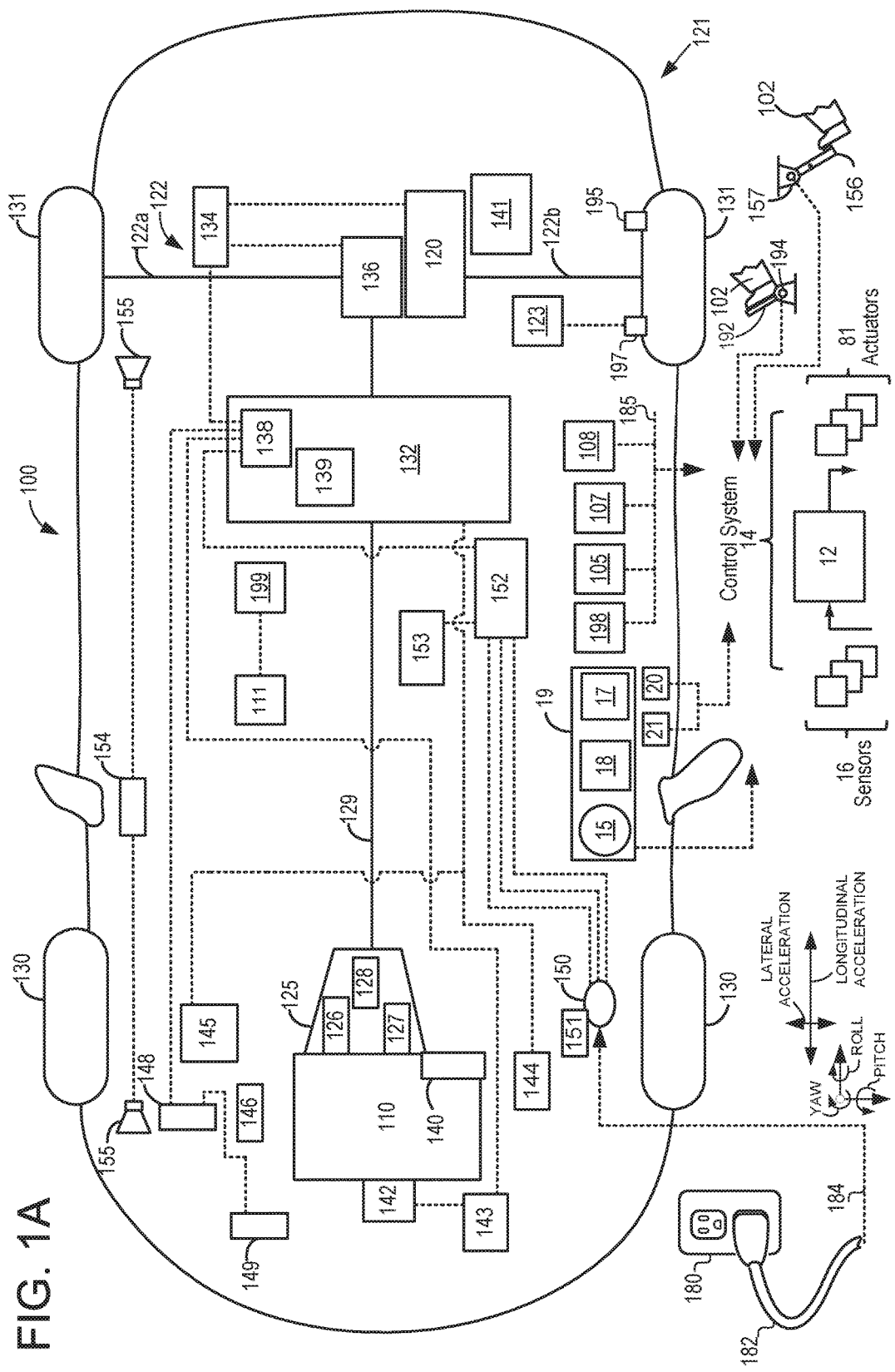
FIG. 1A is a schematic diagram of a hybrid vehicle driveline.

FIG. 1A illustrates an example vehicle propulsion system 100 for vehicle 121. Vehicle propulsion system 100 includes at least two power sources including an internal combustion engine 110 and an electric machine 120. Vehicle propulsion system may further include a crankshaft ISG (CISG) (not shown at FIG. 1A but see FIG. 2), and an electric motor (not shown at FIG. 1A but see FIG. 2). Electric machine 120 (and CISG and/or electric motor) may be configured to utilize or consume a different energy source than engine 110. For example, engine 110 may consume liquid fuel (e.g. gasoline) to produce an engine output while electric machine 120 may consume electrical energy to produce an electric machine output. As such, a vehicle with propulsion system 100 may be referred to as a hybrid electric vehicle (HEV). Throughout the description of FIG. 1A, mechanical connections between various components is illustrated as solid lines, whereas electrical connections between various components are illustrated as dashed lines. Discussed herein are electric motor, electric machine, etc. It may be understood that electric motor may be used interchangeably with electric machine without departing from the scope of this disclosure.

Vehicle propulsion system 100 has a front axle (not shown) and a rear axle 122. In some examples, rear axle may comprise two half shafts, for example first half shaft 122a, and second half shaft 122b. Vehicle propulsion system 100 further has front wheels 130 and rear wheels 131. The rear axle 122 is coupled to electric machine 120 and transmission 125, via which the rear axle 122 may be driven. The rear axle 122 may be driven either purely electrically and exclusively via electric machine 120 (e.g., electric only drive or propulsion mode, engine is not combusting air and fuel or rotating), in a hybrid fashion via electric machine 120 and engine 110 (e.g., parallel mode), or exclusively via engine 110 (e.g., engine only propulsion mode), in a purely combustion engine-operated fashion. Rear drive unit 136 may transfer power from engine 110 or electric machine 120, to axle 122, resulting in rotation of drive wheels 131. Rear drive unit 136 may include a gear set and one or more clutches to decouple transmission 125 and electric machine 120 from wheels 131.

A transmission 125 is illustrated in FIG. 1A as connected between engine 110, and electric machine 120 assigned to rear axle 122. In one example, transmission 125 is a dual clutch transmission (DCT). In an example wherein transmission 125 is a DCT, DCT may include a first clutch 126, a second clutch 127, and a gear box 128. DCT 125 outputs torque to drive shaft 129 to supply torque to wheels 131. As will be discussed in further detail below with regard to FIG. 3, transmission 125 may shift gears by selectively opening and closing first clutch 126 and second clutch 127.

Electric machine 120 may receive electrical power from onboard energy storage device 132. Furthermore, electric machine 120 may provide a generator function to convert engine output or the vehicle's kinetic energy into electrical energy, where the electrical energy may be stored at energy storage device 132 for later use by the electric machine 120 or integrated starter/generator (ISG) 142. A first inverter system controller (ISC1) 134 may convert alternating current generated by electric machine 120 to direct current for storage at the energy storage device 132 and vice versa.

In some examples, energy storage device 132 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 132 may include one or more batteries and/or capacitors.

In further examples, energy storage device 132 may be configured to store electrical energy that may be supplied to a crankshaft ISG (CISG) (not shown at FIG. 1A but see FIG. 2), where the CISG may be positioned between engine 110 and transmission 125. Still further, energy storage device 132 may be configured to store electrical energy that may be supplied to an electric motor (not shown at FIG. 1A, but see FIG. 2), where the electric motor may be positioned between clutches (126 and 127), and a transmission gearbox 128.

Control system 14 may communicate with one or more of engine 110, electric machine 120, energy storage device 132, integrated starter/generator 142, transmission 125, etc. Control system 14 may receive sensory feedback information from one or more of engine 110, electric machine 120, energy storage device 132, integrated starter/generator 142, transmission 125, etc. Further, control system 14 may send control signals to one or more of engine 110, electric machine 120, energy storage device 132, transmission 125, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source 180 (e.g., a stationary power grid) residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 132 from power source 180 via an electrical energy transmission cable 182. During a recharging operation of energy storage device 132 from power source 180, electrical transmission cable 182 may electrically couple energy storage device 132 and power source 180. In some examples, power source 180 may be connected at inlet port 150. Furthermore, in some examples, a charge status indicator 151 may display a charge status of energy storage device 132.

In some examples, electrical energy from power source 180 may be received by charger 152. For example, charger 152 may convert alternating current from power source 180 to direct current (DC), for storage at energy storage device 132. Furthermore, a DC/DC converter 153 may convert a source of direct current from charger 152 from one voltage to another voltage. In other words, DC/DC converter 153 may act as a type of electric power converter.

While the vehicle propulsion system is operated to propel the vehicle, electrical transmission cable 182 may be disconnected between power source 180 and energy storage device 132. Control system 14 may identify and/or control the amount of electrical energy stored at the energy storage device, which may be referred to as the state of charge (SOC).

In other examples, electrical transmission cable 182 may be omitted, where electrical energy may be received wirelessly at energy storage device 132 from power source 180. For example, energy storage device 132 may receive electrical energy from power source 180 via one or more of electromagnetic induction, radio waves, and electromagnetic resonance. As such, it should be appreciated that any suitable approach may be used for recharging energy storage device 132 from a power source that does not comprise part of the vehicle. In this way, electric machine 120 may propel the vehicle by utilizing an energy source other than the fuel utilized by engine 110.

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

Vehicle propulsion system 100 may also include an ambient temperature/humidity sensor 198, and sensors dedicated to indicating the occupancy-state of the vehicle, for example onboard cameras 105, seat load cells 107, and door sensing technology 108. Vehicle system 100 may also include inertial sensors 199. Inertial sensors 199 may comprise one or more of the following: longitudinal, latitudinal, vertical, yaw, roll, and pitch sensors (e.g., accelerometers). Axes of yaw, pitch, roll, lateral acceleration, and longitudinal acceleration are as indicated. As one example, inertial sensors 199 may couple to the vehicle's restraint control module (RCM) (not shown), the RCM comprising a subsystem of control system 14. The control system may adjust engine output and/or the wheel brakes to increase vehicle stability in response to sensor(s) 199. In another example, the control system may adjust an active suspension system 111 responsive to input from inertial sensors 199. Active suspension system 111 may comprise an active suspension system having hydraulic, electrical, and/or mechanical devices, as well as active suspension systems that control the vehicle height on an individual corner basis (e.g., four corner independently controlled vehicle heights), on an axle-by-axle basis (e.g., front axle and rear axle vehicle heights), or a single vehicle height for the entire vehicle. Data from inertial sensor 199 may also be communicated to controller 12, or alternatively, sensors 199 may be electrically coupled to controller 12.

One or more tire pressure monitoring sensors (TPMS) may be coupled to one or more tires of wheels in the vehicle. For example, FIG. 1A shows a tire pressure sensor 197 coupled to wheel 131 and configured to monitor a pressure in a tire of wheel 131. While not explicitly illustrated, it may be understood that each of the four tires indicated in FIG. 1A may include one or more tire pressure sensor(s) 197. Furthermore, in some examples, vehicle propulsion system 100 may include a pneumatic control unit 123. Pneumatic control unit may receive information regarding tire pressure from tire pressure sensor(s) 197, and send said tire pressure information to control system 14. Based on said tire pressure information, control system 14 may command pneumatic control unit 123 to inflate or deflate tire(s) of the vehicle wheels. While not explicitly illustrated, it may be understood that pneumatic control unit 123 may be used to inflate or deflate tires associated with any of the four wheels illustrated in FIG. 1A. For example, responsive to an indication of a tire pressure decrease, control system 14 may command pneumatic control system unit 123 to inflate one or more tire(s). Alternatively, responsive to an indication of a tire pressure increase, control system 14 may command pneumatic control system unit 123 to deflate tire(s) one or more tires. In both examples, pneumatic control system unit 123 may be used to inflate or deflate tires to an optimal tire pressure rating for said tires, which may prolong tire life.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include an accelerometer 20. Vehicle propulsion system 100 may further include an inclinometer 21.

Vehicle propulsion system 100 may further include a starter 140. Starter 140 may comprise an electric motor, hydraulic motor, etc., and may be used to rotate engine 110 so as to initiate engine 110 operation under its own power.

Vehicle propulsion system 100 may further include a brake system control module (BSCM) 141. In some examples, BSCM 141 may comprise an anti-lock braking system or anti-skid braking system, such that wheels (e.g. 130, 131) may maintain tractive contact with the road surface according to driver inputs while braking, which may thus prevent the wheels from locking up, to prevent skidding. In some examples, BSCM may receive input from wheel speed sensors 195.

Vehicle propulsion system 100 may further include a belt integrated starter generator (BISG) 142. BISG may produce electric power when the engine 110 is in operation, where the electrical power produced may be used to supply electric devices and/or to charge the onboard storage device 132. As indicated in FIG. 1A, a second inverter system controller (ISC2) 143 may receive alternating current from BISG 142, and may convert alternating current generated by BISG 142 to direct current for storage at energy storage device 132. Integrated starter/generator 142 may also provide torque to engine 110 during engine starting or other conditions to supplement engine torque.

Vehicle propulsion system 100 may further include a power distribution box (PDB) 144. PDB 144 may be used for routing electrical power throughout various circuits and accessories in the vehicle's electrical system.

Vehicle propulsion system 100 may further include a high current fuse box (HCFB) 145, and may comprise a variety of fuses (not shown) used to protect the wiring and electrical components of vehicle propulsion system 100.

Vehicle propulsion system 100 may further include a motor electronics coolant pump (MECP) 146. MECP 146 may be used to circulate coolant to diffuse heat generated by at least electric machine 120 of vehicle propulsion system 100, and the electronics system. MECP may receive electrical power from onboard energy storage device 132, as an example.

Controller 12 may comprise a portion of a control system 14. In some examples, controller 12. Control system 14 is shown receiving information from a plurality of sensors 16 (various examples of which are described herein) and sending control signals to a plurality of actuators 81 (various examples of which are described herein). As one example, sensors 16 may include tire pressure sensor(s) 197, wheel speed sensor(s) 195, ambient temperature/humidity sensor 198, onboard cameras 105, seat load cells 107, door sensing technology 108, inertial sensors 199, etc. In some examples, sensors associated with engine 110, transmission 125, electric machine 120, etc., may communicate information to controller 12, regarding various states of engine, transmission, and motor operation, as will be discussed in further detail with regard to FIGS. 1B-3.

Vehicle propulsion system 100 may further include a positive temperature coefficient (PTC) heater 148. As an example, PTC heater 148 may comprise a ceramic material such that when resistance is low, the ceramic material may accept a large amount of current, which may result in a rapid warming of the ceramic element. However, as the element warms and reaches a threshold temperature, the resistance may become very large, and as such, may not continue to produce much heat. As such, PTC heater 148 may be self-regulating, and may have a good degree of protection from overheating.

Vehicle propulsion system 100 may further include an air conditioning compressor module 149, for controlling an electric air conditioning compressor (not shown).

Vehicle propulsion system 100 may further include a vehicle audible sounder for pedestrians (VASP) 154. For example, VASP 154 may be configured to produce audible sounds via sounders 155. In some examples, audible sounds produced via VASP 154 communicating with sounders 155 may be activated responsive to a vehicle operator triggering the sound, or automatically, responsive to engine speed below a threshold or detection of a pedestrian.

Vehicle propulsion system 100 may also include an onboard navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., engine 110, BISG 142, DCT 125, and electric machine 120) based on an operator input. Various examples of the operator ignition interface 15 may include interfaces that require a physical apparatus, such as an active key, that may be inserted into the operator ignition interface 15 to start the engine 110 and turn on the vehicle, or may be removed to shut down the engine 110 and turn off the vehicle. Other examples may include a passive key that is communicatively coupled to the operator ignition interface 15. The passive key may be configured as an electronic key fob or a smart key that does not have to be inserted or removed from the ignition interface 15 to operate the vehicle engine 10. Rather, the passive key may be located inside or proximate to the vehicle (e.g., within a threshold distance of the vehicle). Still other examples may additionally or optionally use a start/stop button that is manually pressed by the operator to start or shut down the engine 110 and turn the vehicle on or off. In other examples, a remote engine start may be initiated remote computing device (not shown), for example a cellular telephone, or smartphone-based system where a user's cellular telephone sends data to a server and the server communicates with the vehicle controller 12 to start the engine.

Figure 1B:
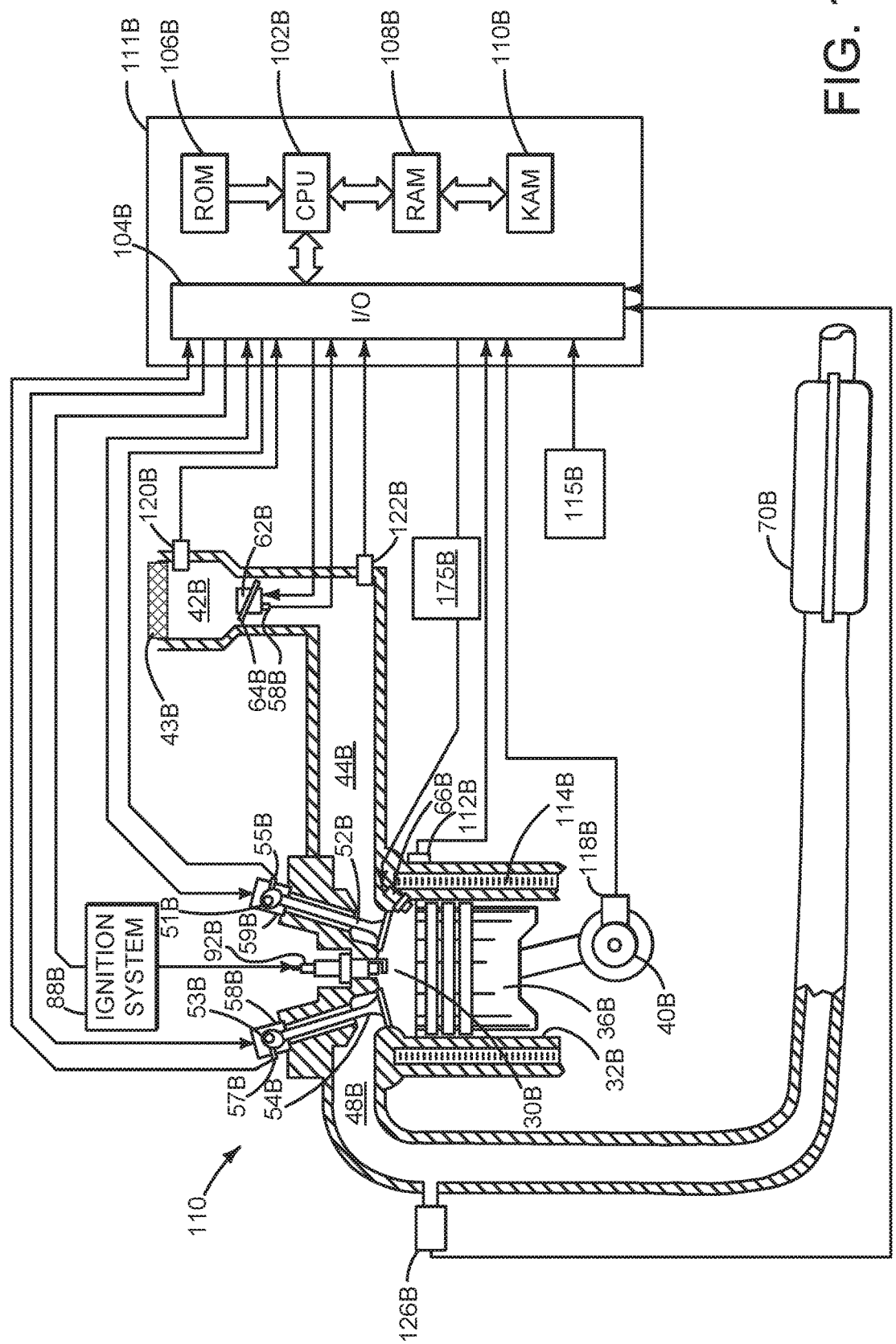
FIG. 1B is a sketch of an engine of the hybrid vehicle driveline.

Referring to FIG. 1B, a detailed view of internal combustion engine 110, comprising a plurality of cylinders, one cylinder of which is shown in FIG. 1B, is shown. Engine 110 is controlled by electronic engine controller 111B. Engine 110 includes combustion chamber 30B and cylinder walls 32B with piston 36B positioned therein and connected to crankshaft 40B. Combustion chamber 30B is shown communicating with intake manifold 44B and exhaust manifold 48B via respective intake valve 52B and exhaust valve 54B. Each intake and exhaust valve may be operated by an intake cam 51B and an exhaust cam 53B. The position of intake cam 51B may be determined by intake cam sensor 55B. The position of exhaust cam 53B may be determined by exhaust cam sensor 57B. Intake cam 51B and exhaust cam 53B may be moved relative to crankshaft 40B. Intake valves may be deactivated and held in a closed state via intake valve deactivating mechanism 59B. Exhaust valves may be deactivated and held in a closed state via exhaust valve deactivating mechanism 58B.

Fuel injector 66B is shown positioned to inject fuel directly into cylinder 30B, which is known to those skilled in the art as direct injection. Alternatively, fuel may be injected to an intake port, which is known to those skilled in the art as port injection. Fuel injector 66B delivers liquid fuel in proportion to the pulse width of signal from engine controller 111B. Fuel is delivered to fuel injector 66B by a fuel system 175B, which includes a tank and pump. In addition, intake manifold 44B is shown communicating with optional electronic throttle 62B (e.g., a butterfly valve) which adjusts a position of throttle plate 64B to control air flow from air filter 43B and air intake 42B to intake manifold 44B. Throttle 62B regulates air flow from air filter 43B in engine air intake 42B to intake manifold 44B. In some examples, throttle 62B and throttle plate 64B may be positioned between intake valve 52B and intake manifold 44B such that throttle 62B is a port throttle.

Distributorless ignition system 88B provides an ignition spark to combustion chamber 30B via spark plug 92B in response to engine controller 111B. Universal Exhaust Gas Oxygen (UEGO) sensor 126B is shown coupled to exhaust manifold 48B upstream of catalytic converter 70B in a direction of exhaust flow. Alternatively, a two-state exhaust gas oxygen sensor may be substituted for UEGO sensor 126B.

Converter 70B can include multiple catalyst bricks, in one example. In another example, multiple emission control devices, each with multiple bricks, can be used. Converter 70B can be a three-way type catalyst in one example.

Engine controller 111B is shown in FIG. 1B as a conventional microcomputer including: microprocessor unit 102B, input/output ports 104B, read-only memory 106B (e.g., non-transitory memory), random access memory 108B, keep alive memory 110B, and a conventional data bus. Other controllers mentioned herein may have a similar processor and memory configuration. Engine controller 111B is shown receiving various signals from sensors coupled to engine 110, in addition to those signals previously discussed, including: engine coolant temperature (ECT) from temperature sensor 112B coupled to cooling sleeve 114B; a measurement of engine manifold pressure (MAP) from pressure sensor 122B coupled to intake manifold 44B; an engine position sensor from a Hall effect sensor 118B sensing crankshaft 40B position; a measurement of air mass entering the engine from sensor 120B; and a measurement of throttle position from sensor 58B. Barometric pressure may also be sensed (sensor not shown) for processing by engine controller 111B. In a preferred aspect of the present description, engine position sensor 118B produces a predetermined number of equally spaced pulses every revolution of the crankshaft from which engine speed (RPM) can be determined. Engine controller 111B may receive input from human/machine interface 115B (e.g., pushbutton or touch screen display).

During operation, each cylinder within engine 110 typically undergoes a four stroke cycle: the cycle includes the intake stroke, compression stroke, expansion stroke, and exhaust stroke. During the intake stroke, generally, the exhaust valve 54B closes and intake valve 52B opens. Air is introduced into combustion chamber 30B via intake manifold 44B, and piston 36B moves to the bottom of the cylinder so as to increase the volume within combustion chamber 30B. The position at which piston 36B is near the bottom of the cylinder and at the end of its stroke (e.g. when combustion chamber 30B is at its largest volume) is typically referred to by those of skill in the art as bottom dead center (BDC). During the compression stroke, intake valve 52B and exhaust valve 54B are closed. Piston 36B moves toward the cylinder head so as to compress the air within combustion chamber 30B. The point at which piston 36B is at the end of its stroke and closest to the cylinder head (e.g. when combustion chamber 30B is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92B, resulting in combustion. During the expansion stroke, the expanding gases push piston 36B back to BDC. Crankshaft 40B converts piston movement into a rotational torque of the rotary shaft. Finally, during the exhaust stroke, the exhaust valve 54B opens to release the combusted air-fuel mixture to exhaust manifold 48B and the piston returns to TDC. Note that the above is shown merely as an example, and that intake and exhaust valve opening and/or closing timings may vary, such as to provide positive or negative valve overlap, late intake valve closing, or various other examples.

Figure 2:
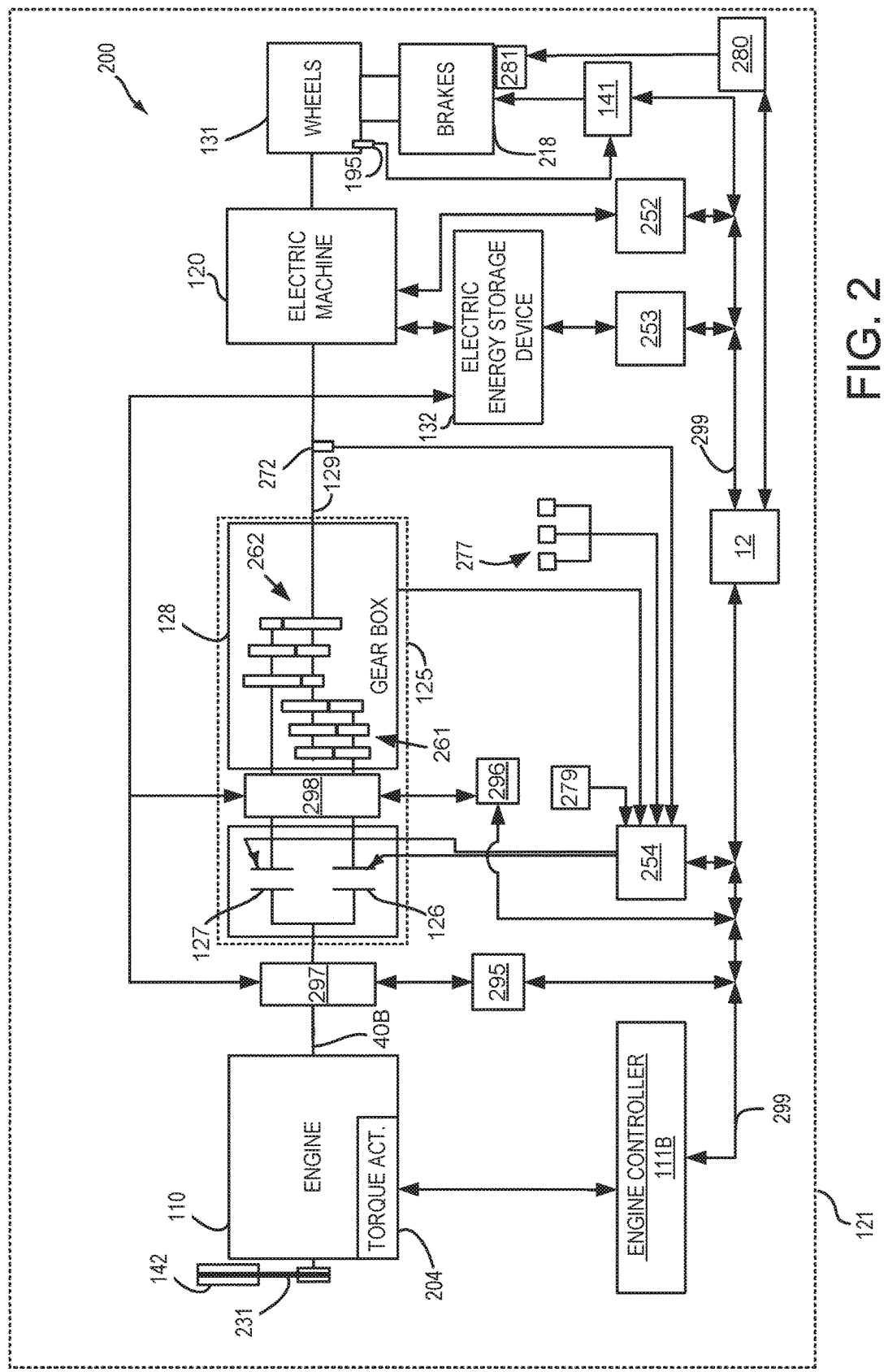
FIG. 2 is a schematic diagram of the hybrid vehicle driveline including controllers of various driveline components.

FIG. 2 is a block diagram of vehicle 121 including a powertrain or driveline 200. The powertrain of FIG. 2 includes engine 110 shown in FIGS. 1A-1B. Other components of FIG. 2 that are common with FIG. 1A are indicated by like numerals, and will be discussed in detail below. Powertrain 200 is shown including vehicle system controller 12, engine controller 111B, electric machine controller 252, CISG controller 295, electric motor controller 296, transmission controller 254, energy storage device controller 253, and brake controller 141 (also referred to herein as brake system control module). The controllers may communicate over controller area network (CAN) 299. Each of the controllers may provide information to other controllers such as torque output limits (e.g. torque output of the device or component being controlled not to be exceeded), toque input limits (e.g. torque input of the device or component being controlled not to be exceeded), torque output of the device being controlled, sensor an actuator data, diagnostic information (e.g. information regarding a degraded transmission, information regarding a degraded engine, information regarding a degraded electric machine, information regarding degraded brakes). Further, the vehicle system controller 12 may provide commands to engine controller 111B, electric machine controller 252, CISG controller 295, electric motor controller 296, transmission controller 254, and brake controller 141 to achieve driver input requests and other requests that are based on vehicle operating conditions.

For example, in response to a driver releasing an accelerator pedal and vehicle speed decreasing, vehicle system controller 12 may request a desired wheel torque or wheel power level to provide a desired rate of vehicle deceleration. The desired wheel torque may be provided by vehicle system controller 12 requesting a first braking torque from electric machine controller 252 and a second braking torque from brake controller 141, the first and second torques providing the desired braking torque at vehicle wheels 131.

In other examples, the partitioning of controlling powertrain devices may be partitioned differently than is illustrated in FIG. 2. For example, a single controller may take the place of vehicle system controller 12, engine controller 111B, electric machine controller 252, CISG controller 295, electric motor controller 296, transmission controller 254, and brake controller 141. Alternatively, the vehicle system controller 12 and the engine controller 111B may be a single unit while the electric machine controller 252, the transmission controller 254, and the brake controller 141 may be standalone controllers.

In this example, powertrain 200 may be powered by engine 110 and electric machine 120. In other examples, engine 110 may be omitted. Engine 110 may be started with an engine starter (e.g. 140), via belt integrated starter/generator (BISG) 142, via CISG 297, via electric motor 298, or via electric machine 120. Thus, it may be understood that powertrain 200 may further be powered via a CISG 297, or electric motor 298, where included.

In some examples, BISG may be coupled directly to the engine crankshaft at either end (e.g., front or back) of the crankshaft. Electric machine 120 (e.g. high voltage electric machine, operated with greater than 30 volts), is also referred to herein as electric machine, motor, and/or generator. Further, torque of engine 110 may be adjusted via a torque actuator 204, such as a fuel injector, throttle, etc.

BISG 142 is mechanically coupled to engine 110 via belt 231. BISG 142 may be coupled to a crankshaft 40B or a camshaft (not shown). BISG 142 may operate as a motor when supplied with electrical power via electric energy storage device 132, also referred to herein as onboard energy storage device 132. BISG 142 may additionally operate as a generator supplying electrical power to electric energy storage device 132.

Driveline 200 includes engine 110 mechanically coupled to dual clutch transmission (DCT) 125 via crank shaft 40B. DCT 125 includes a first clutch 126, a second clutch 127, and a gear box 128. DCT 125 outputs torque to shaft 129, to supply torque to vehicle wheels 131. Transmission controller 254 selectively opens and closes first clutch 126 and second clutch 127 to shift DCT 125. In some examples, there are no other driveline clutches or disconnect devices other than those shown in FIG. 2. However, in other examples, additional clutches or disconnect devices may be added, if desired.

Gear box 128 may include a plurality of gears. One clutch, for example first clutch 126 may control odd gears 261 (e.g. first, third, fifth, and reverse), while another clutch, for example second clutch 127, may control even gears 262 (e.g. second, fourth, and sixth). By utilizing such an arrangement, gears can be changed without interrupting power flow from the engine 110 to dual clutch transmission 125.

Electric machine 120 may be operated to provide torque to powertrain 200 or to convert powertrain torque into electrical energy to be stored in electrical energy storage device 132 in a regeneration mode. Additionally, electric machine 120 may convert the vehicle's kinetic energy into electrical energy for storage in electric energy storage device 132. Electric machine 120 is in electrical communication with energy storage device 132. Electric machine 120 has a higher output torque capacity than starter (e.g. 140) depicted in FIG. 1A, or BISG 142. Further, electric machine 120 directly drives powertrain 200, or is directly driven by powertrain 200.

Furthermore, CISG 297 and/or electric motor 298 may be operated to provide torque to powertrain 200 or to convert powertrain torque into electrical energy to be stored in electrical energy storage device 132 in a regeneration mode. CISG 297 and/or electric motor 298 may convert the vehicle's kinetic energy into electrical energy for storage in electric energy storage device 132. Thus, CISG 297 and electric motor 298 are in electrical communication with energy storage device 132. Further, CISG 297 and electric motor 298 may directly drive powertrain 200, or may be driven directly by powertrain 200.

Electrical energy storage device 132 (e.g. high voltage battery or power source) may be a battery, capacitor, or inductor. Electric machine 120 is mechanically coupled to wheels 131 and dual clutch transmission via a gear set in rear drive unit 136 (shown in FIG. 1A). Electric machine 120 may provide a positive torque or a negative torque to powertrain 200 via operating as a motor or generator as instructed by electric machine controller 252.

Further, a frictional force may be applied to wheels 131 by engaging friction wheel brakes 218. In one example, friction wheel brakes 218 may be engaged in response to the driver pressing his foot on a brake pedal (e.g. 192) and/or in response to instructions within brake controller 141. Further, brake controller 141 may apply brakes 218 in response to information and/or requests made by vehicle system controller 12. In the same way, a frictional force may be reduced to wheels 131 by disengaging wheel brakes 218 in response to the driver releasing his foot from a brake pedal, brake controller instructions, and/or vehicle system controller instructions and/or information. For example, vehicle brakes may apply a frictional force to wheels 131 via controller 141 as part of an automated engine stopping procedure.

Vehicle system controller 12 may also communicate vehicle suspension settings to suspension controller 280. The suspension (e.g. 111) of vehicle 121 may be adjusted to critically damp, over damp, or under damp the vehicle suspension via variable dampeners 281.

Accordingly, torque control of the various powertrain components may be supervised by vehicle system controller 12 with local torque control for the engine 110, transmission 125, electric machine 120, and brakes 218 provided via engine controller 111B, electric machine controller 252, transmission controller 254, and brake controller 141.

As one example, an engine torque output may be controlled by adjusting a combination of spark timing, fuel pulse width, fuel pulse timing, and/or air charge, by controlling throttle (e.g. 62B) opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from electric machine 120 by adjusting current flowing to and from field and/or armature windings of electric machine 120 as is known in the art. Similarly, CISG controller 295 may control torque output and electrical energy production from CISG 297 by adjusting current flowing to and from field and/or armature windings of CISG 297 as is known in the art. Further, electric motor controller 296 may control torque output and electrical energy production from electric motor 298 by adjusting current flowing to and from field and/or armature windings of electric motor 298 as is known in the art.

Transmission controller 254 may receive transmission output shaft torque from torque sensor 272. Alternatively, sensor 272 may be a position sensor or torque and position sensors. If sensor 272 is a position sensor, transmission controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 111B, and vehicle system controller 12, may also receive additional transmission information from sensors 277, which may include but are not limited to pump output line pressure sensors, transmission hydraulic pressure sensors (e.g., gear clutch fluid pressure sensors), motor temperature sensors, BISG temperatures, shift selector position sensors, synchronizer position sensors, first input shaft speed sensor(s), second input shaft speed sensor(s), and ambient temperature sensors. Transmission controller may also receive a requested transmission state (e.g., requested gear or park mode) from shift selector 279, which may be a lever, switches, or other device.

Brake controller 141 receives wheel speed information via wheel speed sensor 195 and braking requests from vehicle system controller 12. Brake controller 141 may also receive brake pedal position information from brake pedal sensor (e.g. 157) shown in FIG. 1A directly or over CAN 299. Brake controller 141 may provide braking responsive to a wheel torque command from vehicle system controller 12. Brake controller 141 may also provide anti-lock and vehicle stability braking to improve vehicle braking and stability. As such, brake controller 141 may provide a wheel torque limit (e.g., a threshold negative wheel torque not to be exceeded) to the vehicle system controller 12 so that negative motor torque does not cause the wheel torque limit to be exceeded. For example, if controller 12 issues a negative wheel torque limit of 50 N-m, motor torque may be adjusted to provide less than 50 N-m (e.g., 49 N-m) of negative torque at the wheels, including accounting for transmission gearing.

Positive torque may be transmitted to vehicle wheels 131 in a direction starting at engine 110 and ending at wheels 131. Thus, according to the direction of positive torque flow in driveline 200, engine 110 is positioned in driveline 200 upstream of transmission 125. Transmission 125 is positioned upstream of electric machine 120, and BISG 142 may be positioned upstream of engine 110, or downstream of engine 110 and upstream of transmission 125. Furthermore, CISG 297 is positioned downstream of engine but upstream of transmission 125. Still further, electric motor 298 is positioned downstream of clutches (126 and 127), and upstream of gearbox 128.

Figure 3:
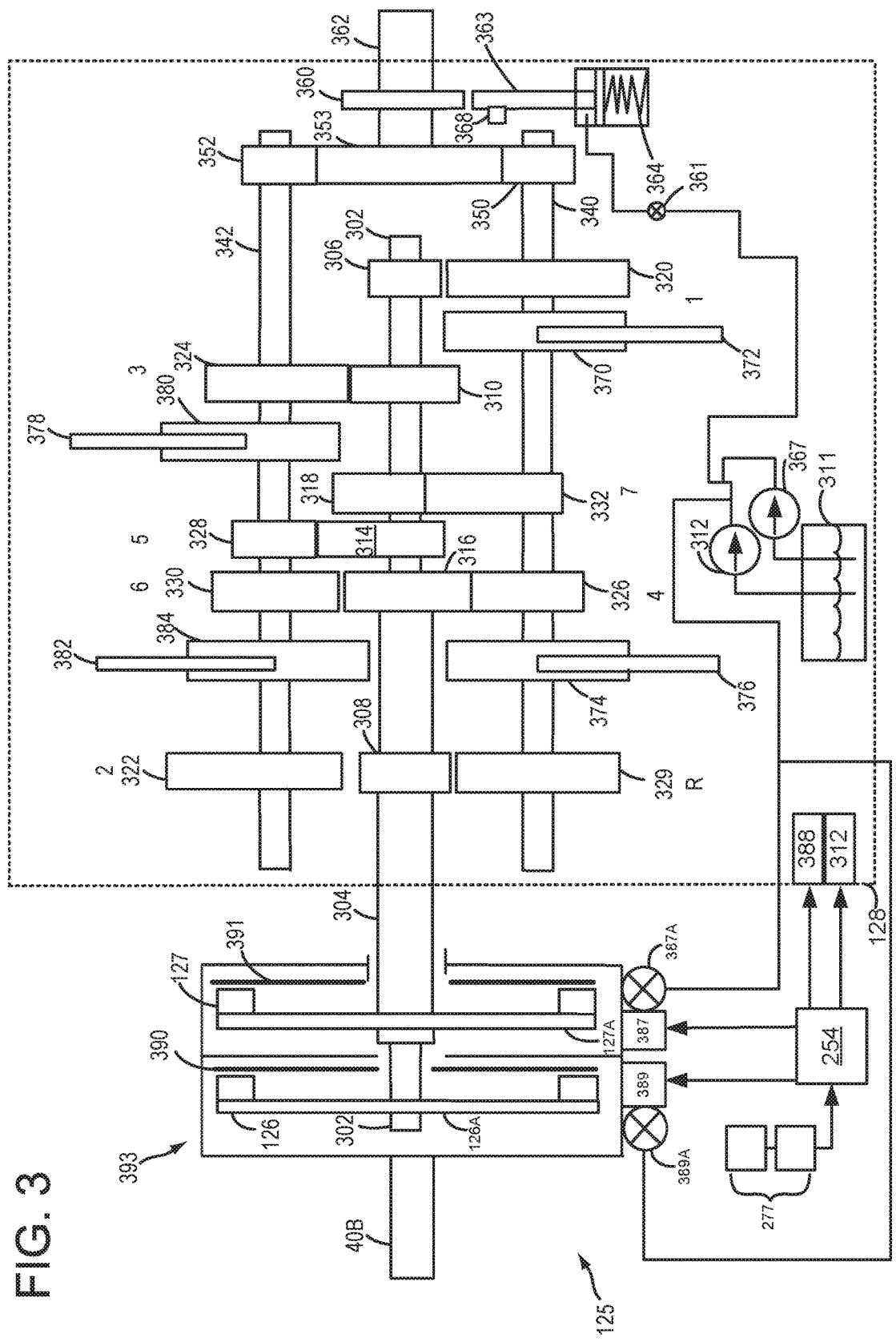
FIG. 3 is a schematic diagram of a dual clutch transmission located in the hybrid vehicle driveline.
Figure 4A:
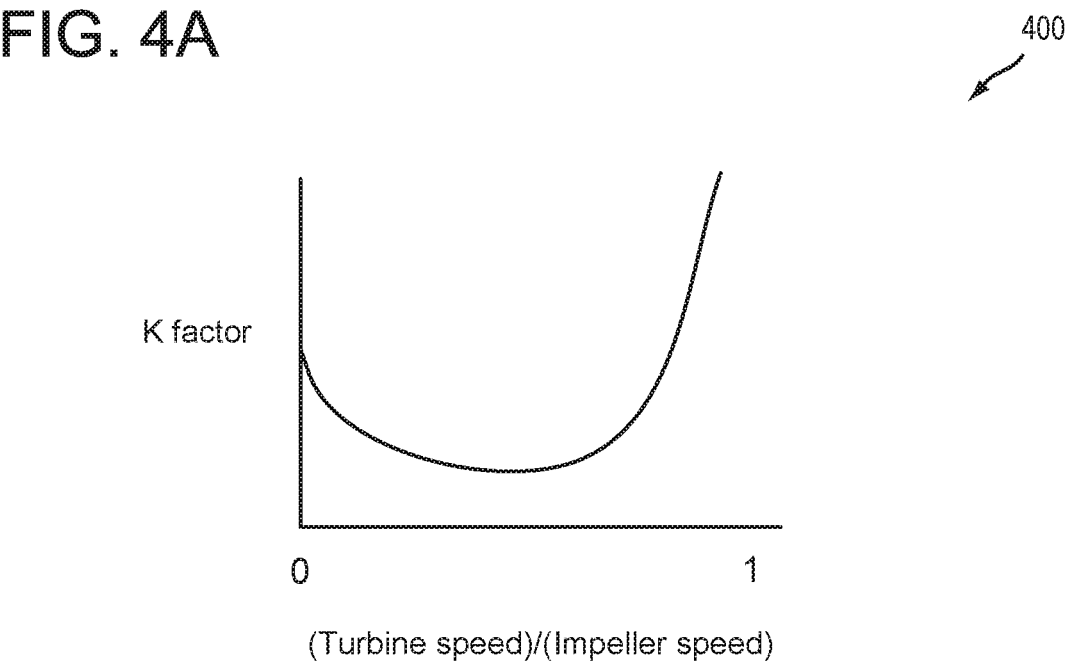
FIG. 4A shows an example plot of a torque converter k-factor as a function of a ratio of turbine speed to impeller speed.
Figure 4B:
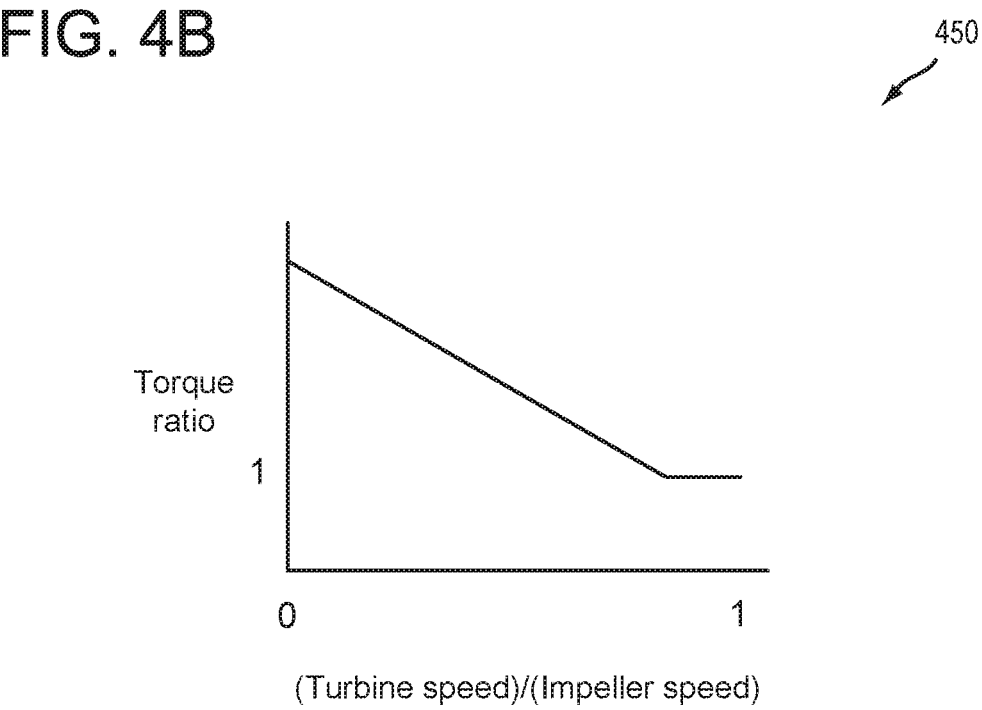
FIG. 4B shows an example plot of a torque converter torque ratio as a function of a ratio of turbine speed to impeller speed.

FIG. 3 shows a detailed illustration of a dual clutch transmission (DCT) 125. Engine crankshaft 40B is illustrated as coupling to a clutch housing 393. Alternatively, a shaft may couple crankshaft 40B to clutch housing 393. Clutch housing 393 may spin in accordance with rotation of crankshaft 40B. Clutch housing 393 may include a first clutch 126 and a second clutch 127. Furthermore, each of first clutch 126 and second clutch 127 have an associated first clutch plate 390, and a second clutch plate 391, respectively. In some examples, the clutches may comprise wet clutches, bathed in oil (for cooling), or dry plate clutches. Engine torque may be transferred from clutch housing 393 to either first clutch 126 or second clutch 127. First transmission clutch 126 transfers torque between engine 110 (shown in FIG. 1A) and first transmission input shaft 302. As such, clutch housing 393 may be referred to as an input side of first transmission clutch 126 and 126A may be referred to as an output side of first transmission clutch 126. Second transmission clutch 127 transfers torque between engine 110 (shown in FIG. 1A) and second transmission input shaft 304. As such, clutch housing 393 may be referred to as an input side of second transmission clutch 127 and 127A may be referred to as an output side of second transmission clutch 127.

A gear box 128 may include a plurality of gears, as discussed above. There are two transmission input shafts, including first transmission input shaft 302, and second transmission input shaft 304. Second transmission input shaft 304 is hollow, while first transmission input shaft 302 is solid, and sits coaxially within the second transmission input shaft 304. As an example, first transmission input shaft 302 may have a plurality of fixed gears. For example, first transmission input shaft 302 may include first fixed gear 306 for receiving first gear 320, third fixed gear 310 for receiving third gear 324, fifth fixed gear 314 for receiving fifth gear 328, and seventh fixed gear 318 for receiving seventh gear 332. In other words, first transmission input shaft 302 may be selectively coupled to a plurality of odd gears. Second transmission input shaft 304 may include second fixed gear 308 for receiving second gear 322, or a reverse gear 329, and may further include fourth fixed gear 316, for receiving either fourth gear 326 or sixth gear 330. Accordingly, the dual clutch transmission may simultaneously have engaged two different gear ratios (e.g. first gear 320 received via first fixed gear 306, and second gear 322 received by second fixed gear 308).

It may be understood that both first transmission input shaft 302 and second transmission input shaft 304 may be connected to each of first clutch 126 and second clutch 127 via spines (not shown) on the outside of each shaft, respectively. In a normal resting state, each of first clutch 126 and second clutch 127 are held open (e.g. fully open), for example via springs (not shown), etc., such that no torque from engine (e.g. 110) may be transmitted to first transmission input shaft 302 or second transmission input shaft 304 when each of the respective clutches are in a fully open state. Responsive to closing first clutch 126, engine torque may be transmitted to first transmission input shaft 302, and responsive to closing second clutch 127, engine torque may be transmitted to second transmission input shaft 304. In some examples, during normal operation, transmission electronics may ensure that only one clutch is closed at any given time.

Gear box 128 may further include a first layshaft shaft 340, and second layshaft shaft 342. Gears on first layshaft shaft 340 and second layshaft shaft 342 are not fixed, but may freely rotate. In example DCT 125, first layshaft shaft 340 includes first gear 320, second gear 322, sixth gear 330, and seventh gear 332. Second layshaft shaft 342 includes third gear 324, fourth gear 326, fifth gear 328, and reverse gear 329. Both first layshaft shaft 340 and second layshaft shaft 342 may transfer torque via a first output pinion 350, and a second output pinion 352, respectively, to gear 353. In this way, both layshafts may transfer torque via each of first output pinion 350 and second output pinion 352, to output shaft 362, where output shaft may transfer torque to a rear drive unit 136 (shown in FIG. 1A) which may enable each of the driven wheels (e.g. 131 of FIG. 1A) to rotate at different speeds, for example when performing turning maneuvers.

As discussed above, each of first gear 320, second gear 322, third gear 324, fourth gear 326, fifth gear 328, sixth gear 330, seventh gear 332, and reverse gear 329 are not fixed to layshafts (e.g. 340 and 342), but instead may freely rotate. As such, synchronizers may be utilized to enable each of the gears to match the speed of the layshafts, and may further be utilized to lock the gears. In example DCT 125, four synchronizers are illustrated, for example, first synchronizer 370, second synchronizer 374, third synchronizer 380, and fourth synchronizer 384. First synchronizer 370 includes corresponding first selector fork 372, second synchronizer 374 includes corresponding selector fork 376, third synchronizer 380 includes corresponding third selector fork 378, and fourth synchronizer 384 includes corresponding fourth selector fork 382. Each of the selector forks may enable movement of each corresponding synchronizer to lock one or more gears, or to unlock one or more gears. For example, first synchronizer 370 may be utilized to lock either first gear 320 or seventh gear 332. Second synchronizer 382 may be utilized to lock either second gear 322 or sixth gear 330. Third synchronizer 380 may be utilized to lock either third gear 324 or fifth gear 328. Fourth synchronizer 374 may be utilized to lock either fourth gear 326, or reverse gear 329. In each case, movement of the synchronizers may be accomplished via the selector forks (e.g. 372, 376, 378, and 382) moving each of the respective synchronizers to the desired position.

Movement of synchronizers via selector forks may be carried out via transmission control module (TCM) 254 and shift fork actuators 388, where TCM 254 may comprise TCM 254 discussed above with regard to FIG. 2. TCM 254 may collect input signals from various sensors, assess the input, and control various actuators accordingly. Inputs utilized by TCM 254 may include but are not limited to transmission range (P/R/N/D/S/L, etc.), vehicle speed, engine speed and torque, throttle position, engine temperature, ambient temperature, steering angle, brake inputs, gear box input shaft speed (for both first transmission input shaft 302 and second transmission input shaft 304), vehicle attitude (tilt). The TCM may control actuators via an open-loop control, to allow for adaptive control. For example, adaptive control may enable TCM 254 to identify and adapt to clutch engagement points, clutch friction coefficients, and position of synchronizer assemblies. TCM 254 may also adjust first clutch actuator 389 and second clutch actuator 387 to open and close first clutch 126 and second clutch 127. In some examples, first clutch actuator 389 may control a first clutch valve 389A, and second clutch actuator 387 may control a second clutch valve 387A. For example, both first clutch valve 389A and second clutch valve 387A may comprise pressure control valves. Both first clutch valve 389A and second clutch valve 387A may control fluid flow supplied from transmission pump 312, for example, to control opening and closing of first clutch 126 and second clutch 127, respectively. In some examples, TCM 254 may control transmission pump.

TCM 254 is illustrated as receiving input from various sensors 277. As discussed above with regard to FIG. 2, the various sensors may include pump output line pressure sensors, transmission hydraulic pressure sensors (e.g. gear clutch fluid pressure sensors), motor temperature sensors, shifter position sensors, synchronizer position sensors, and ambient temperature sensors. The various sensors 277 may further include wheel speed sensors (e.g. 195), engine speed sensors, engine torque sensors, throttle position sensors, engine temperature sensors, steering angle sensors, and inertial sensors (e.g. 199). Inertial sensors may comprise one or more of the following: longitudinal, latitudinal, vertical, yaw, roll, and pitch sensors, as discussed above with regard to FIG. 1A.

Sensors 277 may further include an input shaft speed (ISS) sensor, which may include a magneto-resistive sensor, and where one ISS sensor may be included for each gear box input shaft (e.g. one for first transmission input shaft 302 and one for second transmission input shaft 304). Sensors 277 may further include an output shaft speed sensor (OSS), which may include a magneto-resistive sensor, and may be attached to output shaft 362. Sensors 277 may further include a transmission range (TR) sensor, which may be utilized by the TCM to detect position of selector forks (e.g. 372, 376, 378, 382).

DCT 125 may be understood to function as described herein. For example, when first clutch 126 is actuated closed, engine torque may be supplied to first transmission input shaft 302. When first clutch 126 is closed, in some examples it may be understood that second clutch 127 is open, and vice versa. Depending on which gear is locked when first clutch 126 is closed, power may be transmitted via the first transmission input shaft 302 to either first layshaft 340 or second layshaft 342, and may be further transmitted to output shaft 362 via either first pinion gear 350 or second pinion gear 352. Alternatively, when second clutch 127 is closed, power may be transmitted via the second transmission input shaft 304 to either first layshaft 340 or second layshaft 342, depending on which gear is locked, and may be further transmitted to output shaft 362 via either first pinion gear 350 or second pinion gear 352. It may be understood that when torque is being transferred to one layshaft (e.g. first layshaft 340), the other layshaft (e.g. second layshaft shaft 342) may continue to rotate even though only the one shaft is driven directly by the input. More specifically, the non-engaged shaft (e.g. second layshaft 342) may continue to rotate as it is driven indirectly by the output shaft 362 and respective pinion gear (e.g. 352).

DCT 125 may enable preselection of gears, which may thus enable rapid switching between gears with minimal loss of torque during shifting. As an example, when first gear 320 is locked via first synchronizer 370, and wherein first clutch 126 is closed (and second clutch 127 is open), power may be transmitted from the engine to first input shaft 302, and to first layshaft 340. While first gear 320 is engaged, second gear 322 may simultaneously be locked via fourth synchronizer 384. Because second gear 322 is locked, this may rotate second input shaft 304, where the second input shaft 304 is speed matched to the vehicle speed in second gear. In an alternative case where a gear is pre-selected on the other layshaft (e.g. second layshaft 442), that layshaft will also rotate as it is driven by output shaft 362 and pinion 352.

When a gear shift is initiated by TCM 254, only the clutches may be actuated to open first clutch 126 and close second clutch 127. Furthermore, outside the TCM, engine speed may be lowered to match the upshift. With the second clutch 127 closed, power may be transmitted from the engine, to second input shaft 304, and to first layshaft 340, and may be further transmitted to output shaft 362 via pinion 350. Subsequent to the shifting of gears being completed, TCM 254 may pre-select the next gear appropriately. For example, TCM 254 may pre-select either a higher or a lower gear, based on input it receives from various sensors 277. In this way, gear changes may be achieved rapidly with minimal loss of engine torque provided to the output shaft 362.

Dual clutch transmission 125 may in some examples include a parking gear 360. A parking pawl 363 may face parking gear 360. When a shift lever is set to park, park pawl 363 may engage parking gear 360. Engagement of parking pawl 363 with parking gear 360 may be accomplished via a parking pawl spring 364, or may be achieved via a cable (not shown), a hydraulic piston (not shown) or a motor (not shown), for example. When parking pawl 363 is engaged with parking gear 360, driving wheels (e.g. 130, 131) of a vehicle may be locked. On the other hand, responsive to the shift lever being moved from park, to another selection (e.g. drive), parking pawl 363 may move such that parking pawl 363 may be disengaged from parking gear 360.

In some examples, an electric transmission pump 312 may supply hydraulic fluid from transmission sump 311 to compress spring 364, in order to release parking pawl 363 from parking gear 360. Electric transmission pump 312 may be powered by an onboard energy storage device (e.g. 132), for example. In some examples, a mechanical pump 367 may additionally or alternatively supply hydraulic fluid from transmission sump 311 to compress spring 364 to release parking pawl 363 from parking gear 360. While not explicitly illustrated, mechanical pump may be driven by the engine (e.g. 110), and may be mechanically coupled to clutch housing 393. A park pawl valve 361 may regulate the flow of hydraulic fluid to spring 364, in some examples.

Thus, discussed herein, a dual clutch transmission (DCT) may comprise a transmission that uses two separate clutches for odd and even gear sets. One clutch (e.g. 126) is utilized to transfer engine torque to one input shaft (e.g. 302), while a separate clutch (e.g. 127) is utilized to transfer engine torque to a separate input shaft (e.g. 304). The dual clutch transmission receives engine torque via an engine crankshaft (e.g. 40B), and outputs torque via an output shaft (e.g. 362).

As discussed above, many vehicle operators have significant experience driving automatic transmission vehicles utilizing a torque converter to provide good vehicle launch behavior. In such examples, the torque converter transmits available engine torque to the transmission to smoothly bring engine and transmission input speeds together while accelerating the vehicle mass. In such examples, the torque converter also provides torque multiplication into the transmission to launch the vehicle. Thus, to meet driver expectations of vehicle launch performance, the hybrid vehicle 121 discussed above with regard to FIGS. 1A-3 may be utilized to emulate the performance of a torque converter.

A torque converter's natural behavior is commonly represented by k-factor and torque ratio parameters, both of which are variable based on the ratio from turbine speed to impeller speed. The torque absorbed by the impeller of a torque converter, and the torque transmitted into the gearbox from the turbine are defined by the following equations:

$$\text{impeller input torque} = (\text{impeller speed})^2/(K\ \text{factor})^2 \quad (1)$$

$$\text{turbine output torque} = (\text{impeller input torque})(\text{torque ratio}) \quad (2)$$

Turning to FIG. 4A, an example plot 400 is shown, representing how the K factor varies as a function of a ratio of turbine speed to impeller speed. At FIG. 4B, an example plot 450 is shown, illustrating how the torque ratio varies as a function of the ratio of turbine speed to impeller speed.

As discussed, there is no torque converter in the hybrid powertrain depicted at FIGS. 1A-3, however it may be possible to utilize a transmission input clutch (e.g. 126, 127), and an electric machine/motor to provide vehicle launch behavior substantially equivalent to launch behavior in a vehicle equipped with a torque converter. To provide vehicle launch behavior similar to launch behavior in a vehicle with a torque converter, the hybrid vehicle powertrain (e.g. 200) depicted above at FIG. 2 may be modeled by denoting the portion of the powertrain upstream of the dual clutch transmission clutches (e.g. 126, 127) (crankshaft side of the DCT launch clutches) to comprise the impeller (of a torque converter), and denoting the portion of the powertrain downstream of the dual clutch transmission clutches (transmission input side of the DCT launch clutches) to comprise the turbine (of a torque converter). It may be possible to use calibration to define k-factor and torque ratio as a constant, as a function of launch clutch slip speed, or another function to define the desired simulated torque converter behavior. Using such parameters, the torque converter equations (equations 1 and 2) defined above may be used in a control algorithm(s) to generate launch clutch and electric machine/motor torque commands, and to coordinate actuators with the engine torque output and vehicle acceleration without complex control interfaces.

In such algorithm(s), the engine (e.g. 110) may make any torque as determined via vehicle controls and driver demand, and the torque converter simulation may simply respond to measured crankshaft (e.g. 40B) speeds, and transmission input shaft (e.g. 302, 304) speeds. The equation for impeller input torque (e.g. equation 1 above) may be used to determine the torque that needs to be absorbed from the engine crankshaft and transmitted through the clutch and into the gearbox to simulate the load torque put on the engine by the hydraulic load of a torque converter. The equation for turbine output torque (e.g. equation 2 above) describes total torque delivered to the gearbox (e.g. 128) input from a torque converter, including the effects of torque multiplication. In the hybrid vehicle 121 described above at FIGS. 1A-3, there is no inherent torque multiplication from the launch clutch, so any difference between the calculated impeller input and turbine output torque may be generated by an electric machine/motor to get the equivalent gearbox input torque that a torque converter would provide for a given engine torque and speed. If an electric machine/motor in front of the gearbox (e.g. 128) and clutches (e.g. 126, 127) is used to provide the additional torque, the launch clutch (e.g. 126 or 127) may carry the additional torque capacity to transmit both the engine and electric machine/motor torque without inducing more clutch slip than desired, or changing the load on the engine (e.g. 110). If an electric machine/motor positioned downstream of the gearbox (e.g. 128) is used to provide the additional torque, then there may be no change to the launch clutch capacity, however the electric machine torque command may include a torque multiplication ratio of the gearbox, to simulate additional torque input to the transmission. Such examples are depicted below with regard to FIGS. 5A-5C, and with regard to FIGS. 6-8.

Thus, the systems of FIGS. 1-3 may enable a system for a vehicle, comprising an engine including a crankshaft mechanically coupled to the engine, a transmission positioned in a driveline downstream of the engine, the transmission configured with at least a clutch configured to transmit engine torque to one or more wheels via the transmission, one or more transmission input shafts, and an electric motor positioned in the driveline. The system may further include a controller. The controller may store instructions in non-transitory memory that, when executed, may cause the controller to control a capacity of the clutch and an output of the electric motor via a model that simulates a torque converter in the driveline. The model may include denoting a portion of the driveline upstream of the clutch as an impeller of the torque converter and denoting another portion of the driveline downstream of the clutch as a turbine of the torque converter. The model may further include defining a simulated impeller input torque as a ratio of an impeller speed squared to a k-factor squared and defining a simulated turbine output torque as the impeller input torque multiplied by a torque ratio, where both the k-factor and the torque ratio are defined as one of either a constant, a function of a slip speed of the clutch, or other parameter. In such an example, a measured speed of the crankshaft mechanically coupled to the engine may be used as the impeller speed in the model and an input shaft speed of a transmission input shaft of the one or more transmission input shafts may be used as a turbine speed of the torque converter. Furthermore, the k-factor and the torque ratio may be a function of a ratio between the input shaft speed and the crankshaft speed.

In one example of the system, the controller may store further instructions to control the output of the electric motor via a difference between the simulated impeller input torque and the simulated turbine output torque.

In an example where the electric motor is positioned in the driveline upstream of the clutch, controlling the capacity of the clutch may be a function of a sum of the electric motor torque command and the simulated impeller input torque.

In an example where the electric motor is positioned in the driveline between the clutch and the transmission, controlling the capacity of the clutch may not include summing the electric motor torque command and the simulated impeller input torque, and a torque multiplication torque may be included in the electric motor torque.

In an example where the electric motor is positioned downstream of the transmission, controlling the capacity of the clutch may be a function of the simulated impeller input torque, and the electric motor torque command may further be a function of a torque ratio of the transmission.

In one example, the transmission of such a system may comprise a dual clutch transmission.

Turning now to FIG. 5A, a first block diagram 500 for controlling a hybrid powertrain such as hybrid powertrain 200 depicted above at FIG. 2 to emulate the performance of a vehicle with a torque converter during a vehicle launch procedure, is shown. More specifically, the method of block diagram 500 may be used under conditions where an electric motor upstream of the DCT clutches, for example BISG (e.g. 142) or CISG (e.g. 297) is utilized to provide torque in addition to the engine. The method of block diagram 500 may be used in the method of FIG. 6, illustrated below.

An engine torque command 502 from driver input, for example via a position of an accelerator pedal (e.g. 192), is communicated via an engine controller (e.g. 111B) to the vehicle engine 110. For example, responsive to a given torque command, engine actuators, for example fuel injector (s) (e.g. 66B), and spark plug (e.g. 92B), may be commanded via the controller to increase engine torque. Crankshaft speed 506 may be determined via an engine speed sensor (e.g. 277). As discussed above, the portion of the powertrain upstream of the DCT clutches (e.g. 126, 127) may be denoted as the impeller (of a torque converter). Thus, crankshaft speed (impeller speed) is squared at multiplier block 508. Furthermore, transmission input shaft speed 538 may be determined via input shaft speed sensor(s) (e.g. 277). Transmission input shaft speed may be understood to be a feedback parameter, for example. As discussed above, the portion of the powertrain downstream of the DCT clutches may be denoted as the turbine (of a torque converter), thus, it may be understood that transmission input shaft speed 538 may be denoted as the turbine speed.

Thus, turbine speed (transmission input shaft speed) 538 is divided by impeller speed (crankshaft speed) 506 at multiplier block 510. The ratio of transmission input shaft speed 538 to crankshaft speed 506 may be utilized to look up a torque ratio 512, and a k-factor 514. The k-factor 514 is squared at multiplier block 516. At multiplier block 518, simulated impeller input torque 524, or engine torque absorbed by the gearbox (e.g. 128), is determined via dividing output from block 508 by output from block 516.

At multiplier block 520, simulated impeller input torque 524 (engine torque absorbed by the gearbox) is multiplied by the torque ratio 512, to give a simulated turbine torque 526, or a desired gearbox total input torque. Simulated turbine torque 526 (desired gearbox total input torque) and simulated impeller input torque 524 (engine torque absorbed by the gearbox) are input to summing junction 522. The difference between simulated turbine torque 526 and simulated impeller input torque is output as a transmission input electric machine torque command 528. The transmission input electric machine torque command 528 is input to block 530, where the electric motor upstream of the DCT clutches (e.g. BISG or CISG) is actuated to produce a torque amount corresponding to the difference between simulated turbine torque 526 and simulated impeller input torque 524. Thus, output from block 530 comprises actual electric machine torque 532, which is added to the simulated impeller input torque 524 (engine torque absorbed by the gearbox) at summing junction 533. Output from summing junction 533 thus comprises a launch clutch torque command 534. The launch clutch torque command 534 is input to box 536, where box 536 comprises transmission and vehicle response to the engine, electric motor, and launch clutch torque. At box 536, transmission input shaft speed 538 may be monitored as discussed above, and output as a feedback parameter.

Thus, it may be understood that box diagram 500 represents an example where an electric motor in front of the gearbox (e.g. 128) and clutches (e.g. 126, 127) is used to provide torque comprising the difference between simulated turbine torque 526 (desired total gearbox input torque) and simulated impeller input torque 524 (engine torque absorbed by the gearbox). It may be further understood that box diagram 500 represents an example where the launch clutch torque capacity may comprise a sum of the simulated impeller torque 524 (engine torque absorbed by the gearbox) and actual electric machine torque 532.

Turning now to FIG. 5B, a second block diagram 540 for controlling a hybrid powertrain such as hybrid powertrain 200 depicted above at FIG. 2 to emulate the performance of a vehicle with a torque converter during a vehicle launch procedure, is shown. More specifically, the method of block diagram 540 may be used under conditions where an electric motor (e.g. 298) positioned upstream of the gearbox (e.g. 128) and downstream of DCT clutches (e.g. 126, 127) is utilized to provide torque in addition to the engine. The method of block diagram 540 may be used in the method of FIG. 7, illustrated below.

All aspects of second block diagram 540 are the same as that of block diagram 500, with a few exceptions. Thus, for clarity and to avoid redundancy, those aspects of second block diagram 540 that are the same as block diagram 500 will not be reiterated herein. Instead, only those aspects that are different between block diagram 540 and block diagram 500 will be discussed.

Accordingly, simulated turbine torque 526 (desired gearbox total input torque) and simulated impeller input torque 524 (engine torque absorbed by the gearbox) are input to summing junction 522, the output of which comprises transmission input electric machine torque command 528. The transmission input electric machine torque command 528 is input to block 530, where the electric motor (e.g. 298) upstream of the gearbox (e.g. 128), and downstream of the DCT clutches (e.g. 126, 127) is actuated to produce a torque amount corresponding to the difference between simulated turbine torque 526 and simulated impeller input torque 524. However, in such an example depicted at block diagram 540, because the electric motor (e.g. 298) is positioned downstream of the DCT clutches, but upstream of the gearbox, no modification may be made to the launch clutch torque capacity command 534, and the torque multiplication torque may be directly commanded to the electric motor (e.g. 298).

Figure 8:
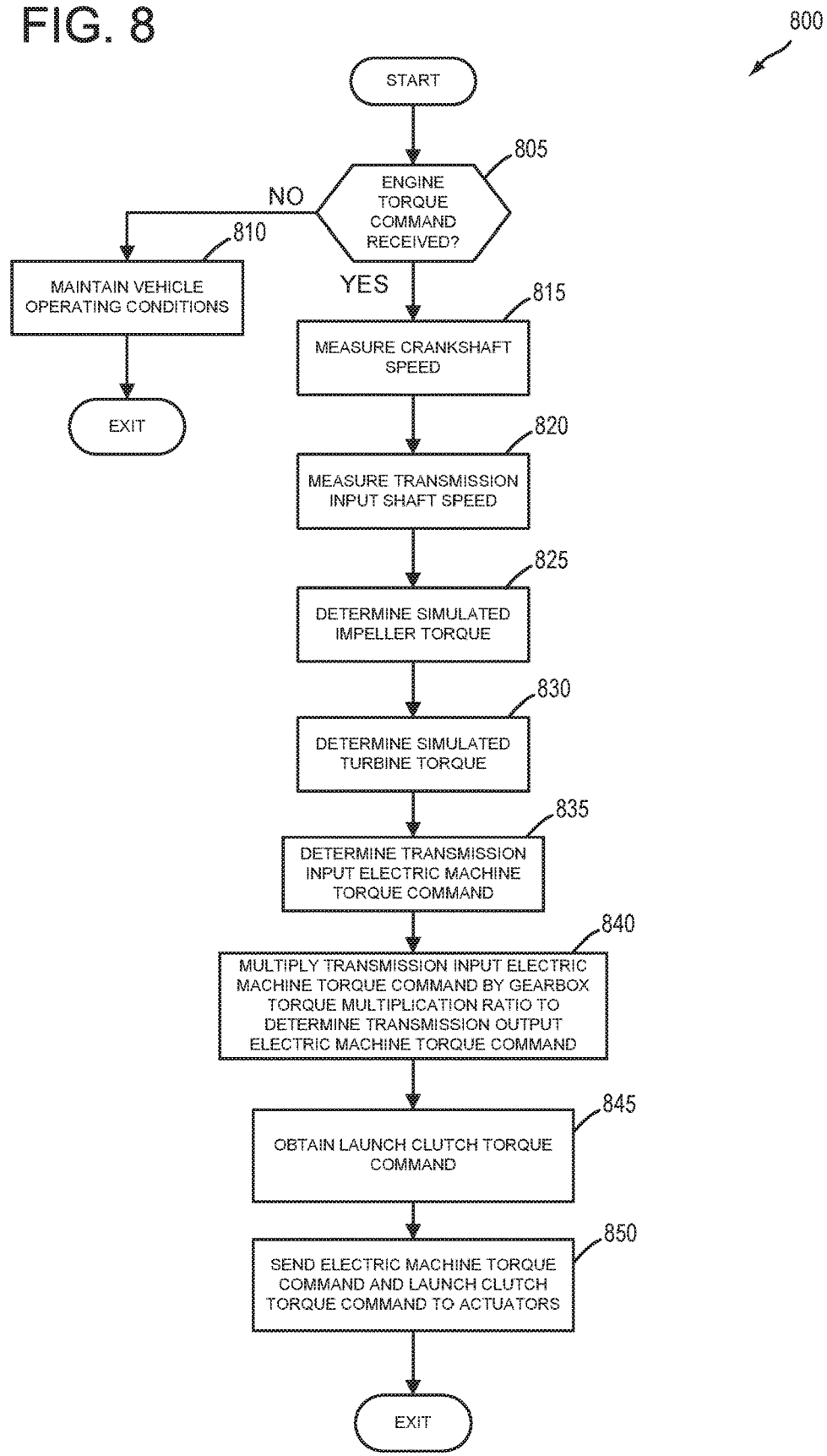
FIG. 8 shows an example method for controlling a hybrid powertrain to emulate the performance of a vehicle with a torque converter during a vehicle launch procedure, which may be utilized in conjunction with the block diagram depicted at FIG. 5C.

Turning now to FIG. 5C, a third block diagram 550 for controlling a hybrid powertrain such as hybrid powertrain 200 depicted above at FIG. 2 to emulate the performance of a vehicle with a torque converter during a vehicle launch procedure, is shown. More specifically, the method of block diagram 550 may be used under conditions where an electric machine (e.g. 120) positioned downstream of the gearbox (e.g. 128) is utilized to provide torque in addition to the engine. The method of block diagram 550 may be used in the method of FIG. 8, illustrated below.

All aspects of third block diagram 550 are the same as that of block diagrams 500 and 540, with a few exceptions. Thus, for clarity and to avoid redundancy, those aspects of third block diagram 550 that are the same as first block diagram 500 and second block diagram 540 will not be reiterated herein. Instead, only those aspects that are different between block diagram 550 and block diagrams 500 and 540 will be discussed.

Accordingly, simulated turbine torque 526 (desired gearbox total input torque) and simulated impeller input torque 524 (engine torque absorbed by the gearbox) are input to summing junction 522, the output of which comprises transmission input electric machine torque command 528. The transmission input electric machine torque command 528 is multiplied by the torque multiplication ratio of the gearbox 552, at multiplier block 551. Output from multiplier block 551 comprises a transmission output electric machine torque command 553, which is input to block 554. At 554, the electric machine is actuated to produce a torque amount corresponding to the difference between simulated turbine torque 526 and simulated impeller input torque 524, multiplied by the ratio of the gearbox 552.

Thus, for block diagram 550, where an electric machine (e.g. 120) is utilized to provide torque, no modification may be made to the launch clutch torque capacity command 534, but the electric machine torque command 553 may include the torque multiplication ratio of the gearbox 552.

Turning now to FIG. 6, a high level example method 600 for controlling a hybrid powertrain, such as hybrid powertrain 200 depicted above at FIG. 2, to emulate the performance of a vehicle with a torque converter during a vehicle launch procedure, is shown. More specifically, method 600 may be used under conditions where an electric motor upstream of the DCT clutches, for example BISG (e.g. 142) or CISG (e.g. 297) is utilized to provide torque in addition to the engine.

Method 600 will be described with reference to the systems described herein and shown in FIGS. 1A-3, though it should be understood that similar methods may be applied to other systems without departing from the scope of this disclosure. Method 600 may be carried out by a controller, such as controller 12 in FIG. 1, and may be stored at the controller as executable instructions in non-transitory memory. Instructions for carrying out method 600 and the rest of the methods included herein may be executed by the controller based on instructions stored on a memory of the controller and in conjunction with signals received from sensors of the engine system, such as the sensors described above with reference to FIGS. 1A-3. The controller may employ driveline actuators such as ISG (e.g. 142), CISG (e.g. 297), engine torque actuator(s) (e.g. 204), first clutch actuator (e.g. 389), second clutch actuator (e.g. 387), etc., according to the method depicted below.

Method 600 begins at 605 and may include determining whether the controller has received an engine torque command corresponding to a vehicle launch event. Such an indication may be communicated to the vehicle controller (or in some examples, engine controller) via a change in accelerator pedal (e.g. 192), for example. If, at 605, an engine torque command corresponding to a vehicle launch event is not indicated to have been received, method 600 may proceed to 610, and may include maintaining current vehicle operating conditions. For example, if the vehicle is operating with the engine running, then engine operation may be maintained. Similarly, if the vehicle is operating with an electric machine (e.g. 120) providing positive or negative torque to driven wheels, such operation may be maintained at 610. Torque capacity of one or more DCT clutches (e.g. 126, 127) may be maintained. Other vehicle operational control may be maintained unchanged at 610, responsive to a determination that an engine torque command corresponding to a vehicle launch event is not indicated.

Returning to 605, responsive to an indication that an engine torque command corresponding to a vehicle launch event is indicated, method 600 may proceed to 615. At 615, method 600 may include measuring speed of a crankshaft (e.g. 40B) of the vehicle. Measuring the speed of the crankshaft at 615 may comprise receiving speed information from an engine speed sensor (e.g. 277), for example.

Proceeding to 620, method 600 may include measuring transmission input shaft speed. It may be understood that measuring transmission input shaft speed at 620 may comprise measuring speed of the transmission input shaft that is responsible for transferring engine torque to the gearbox of the transmission during the vehicle launch event.

Proceeding to 625, method 600 may include determining simulated impeller torque. As discussed above, the portion of the powertrain upstream of the DCT clutches may be denoted as the impeller of a torque converter. Thus, determining simulated impeller torque at 620 may include determining a ratio of turbine speed to impeller speed, where turbine speed may comprise transmission input shaft speed determined at 620, and impeller speed may comprise crankshaft speed determined at 615. By determining such a ratio, the vehicle controller may retrieve a torque ratio, and a k-factor. For example, lookup tables stored at the controller may include values of torque ratio and k-factor as a function of the ratio of turbine speed (transmission input shaft speed) to impeller speed (crankshaft speed). As an example, FIG. 4A depicts a k-factor as a function of the ratio of turbine speed to impeller speed, and FIG. 4B depicts a torque ratio as a function of turbine speed to impeller speed.

With the k-factor and torque ratio determined, equation (1) depicted above may be utilized to determine the simulated impeller torque. More specifically, simulated impeller torque, or engine torque absorbed by the gearbox (e.g. 128), may be calculated by squaring both the determined k-factor and crankshaft speed, and then dividing the square of crankshaft speed (impeller speed) by the square of the determined k-factor.

Proceeding to 630, method 600 may include determining simulated turbine torque, or desired total gearbox input torque. More specifically, equation (2) depicted above may be utilized to determine simulated turbine torque (desired total gearbox input torque). The torque ratio determined above at 620 may be multiplied by the simulated impeller torque (engine torque absorbed by the gearbox), to obtain the simulated turbine torque (desired total gearbox input torque).

Proceeding to 635, method 600 may include determining a transmission input electric motor torque command. Such a determination may be made via the vehicle controller obtaining a difference between the simulated turbine torque (desired total gearbox input torque) and the simulated impeller torque (engine torque absorbed by the gearbox).

With the transmission input electric motor torque command determined at 635, method 600 may proceed to 640, and may include adding the electric motor torque command to the simulated impeller torque (engine torque absorbed by the gearbox), to obtain a launch clutch torque command. For example, as method 600 depicts an example where an electric motor, for example a BISG (e.g. 142) or CISG (e.g. 297), upstream of the DCT clutches and transmission gearbox is utilized to provide additional torque to the driveline, the launch clutch (e.g. 126 or 127) may be requested to carry the additional torque capacity (in excess of engine torque) to transmit both the engine and electric motor torque without inducing undesirable clutch slip, or changing the load on the engine. As such, at 640, method 600 includes summing the electric motor torque command and the simulated impeller torque, to obtain the launch clutch torque command.

Proceeding to 645, method 600 may include the vehicle controller sending a command to the electric motor (e.g. BISG or CISG), actuating either the BISG or CISG to produce the torque command determined at step 635 of method 600. Furthermore, at 645, method 600 may include the vehicle controller sending a command to an actuator of the launch clutch (e.g. clutch responsible for transmitting engine/motor torque through the transmission during the vehicle launch procedure). As an example, a command from the vehicle controller may be sent to a first clutch actuator (e.g. 389), such that first clutch valve (e.g. 389A) may be controlled (e.g. duty cycled) to control an amount of fluid flow to first clutch, thus controlling a torque capacity of the first clutch. In another example, a command from the vehicle controller may be sent to a second clutch actuator (e.g. 387), such that second clutch valve (e.g. 387A) may be controlled (e.g. duty cycled) to control an amount of fluid flow to second clutch, thus controlling a torque capacity of the second clutch. In either case, it may be understood that the amount of fluid flow (e.g. amount of pressure) supplied to the first clutch or second clutch may comprise an amount of fluid flow to generate a torque capacity equal to that determined at step 640. In other words, the launch clutch torque command determined at step 640 may be sent to the appropriate clutch, such that the appropriate clutch produces the determined amount of launch clutch torque at step 645. Method 600 may then end.

Turning now to FIG. 7, a high level example method 700 for controlling a hybrid powertrain, such as hybrid powertrain 200 depicted above at FIG. 2, to emulate the performance of a vehicle with a torque converter during a vehicle launch procedure, is shown. More specifically, method 700 may be used under conditions where an electric motor (e.g. 298) upstream of the gearbox (e.g. 128), but downstream of the DCT clutches (e.g. 126, 127), is utilized to provide torque in addition to the engine.

Method 700 will be described with reference to the systems described herein and shown in FIGS. 1A-3, though it should be understood that similar methods may be applied to other systems without departing from the scope of this disclosure. Method 700 may be carried out by a controller, such as controller 12 in FIG. 1, and may be stored at the controller as executable instructions in non-transitory memory. Instructions for carrying out method 700 and the rest of the methods included herein may be executed by the controller based on instructions stored on a memory of the controller and in conjunction with signals received from sensors of the engine system, such as the sensors described above with reference to FIGS. 1A-3. The controller may employ driveline actuators such as electric motor (e.g. 298), engine torque actuator(s) (e.g. 204), first clutch actuator (e.g. 389), second clutch actuator (e.g. 387), etc., according to the method depicted below.

It may be understood that method 700 is substantially equivalent to method 600, with minor exceptions. Steps 705 through step 735 are the same as that already described for method 600. Thus, for brevity, the steps of method 700 that are the same as method 600 will not be reiterated here, with the understanding that all aspects of method 700 through step 735 may be accomplished as described above with regard to steps 605-635 of method 600.

Thus, as described above, at step 735 method 700 may include determining a transmission input electric motor torque command. Such a determination may be made via the vehicle controller obtaining a difference between the simulated turbine torque (desired total gearbox input torque) and the simulated impeller torque (engine torque absorbed by the gearbox).

Proceeding to step 740, method 700 may include obtaining a launch clutch torque command. It may be understood that, at step 640 of method 600, the launch clutch torque command was illustrated to be obtained by summing the electric motor torque command and the simulated impeller torque. However, as discussed, the electric motor torque command and the simulated impeller torque is summed for method 600 because the launch clutch (e.g. 126, 127) may be requested to carry the additional torque capacity in excess of engine torque, to transmit both the engine and electric motor torque without inducing undesirable clutch slip, or changing the load on the engine.

Alternatively, method 700 depicts an example where the electric motor (e.g. 298) used to provide the additional torque capacity in excess of engine torque, is downstream of the DCT clutches (e.g. 126, 127), but upstream of the gearbox (e.g. 128). Thus, the launch clutches need not carry additional torque provided via the electric motor. Accordingly, at step 740, obtaining the launch clutch torque command may include obtaining the simulated impeller torque (engine torque absorbed by the gearbox) that was determined at step 725, and designating the launch clutch torque command to be equivalent to the simulated impeller torque.

Proceeding to 745, method 700 may include the vehicle controller sending a command to the electric motor (e.g. 298), actuating the electric motor to produce the torque command determined at step 735 of method 700. Furthermore, at step 745, method 700 may include the vehicle controller sending a command to an actuator of the launch clutch (e.g. clutch responsible for transmitting engine/motor torque through the transmission during the vehicle launch procedure). As an example, a command from the vehicle controller may be sent to a first clutch actuator (e.g. 389), such that first clutch valve (e.g. 389A) may be controlled (e.g. duty cycled) to control an amount of fluid flow to first clutch (e.g. 302), thus controlling a torque capacity of the first clutch. In another example, a command from the vehicle controller may be sent to a second clutch actuator (e.g. 387), such that second clutch valve (e.g. 387A) may be controlled (e.g. duty cycled) to control an amount of fluid flow to second clutch (e.g. 304), thus controlling a torque capacity of the second clutch. In either case, it may be understood that the amount of fluid flow (e.g. amount of pressure) supplied to the first clutch or second clutch may comprise an amount of fluid flow to generate a torque capacity equal to that determined at step 740. In other words, the launch clutch torque command determined at step 740 may be sent to the appropriate clutch, such that the appropriate clutch produces the determined amount of launch clutch torque at step 745. Method 700 may then end.

Turning now to FIG. 8, a high level example method 800 for controlling a hybrid powertrain, such as hybrid powertrain 200 depicted above at FIG. 2, to emulate the performance of a vehicle with a torque converter during a vehicle launch procedure, is shown. More specifically, method 800 may be used under conditions where an electric machine (e.g. 120) downstream of the gearbox (e.g. 128), and downstream of the DCT clutches (e.g. 126, 127), is utilized to provide torque in addition to the engine.

Method 800 will be described with reference to the systems described herein and shown in FIGS. 1A-3, though it should be understood that similar methods may be applied to other systems without departing from the scope of this disclosure. Method 800 may be carried out by a controller, such as controller 12 in FIG. 1, and may be stored at the controller as executable instructions in non-transitory memory. Instructions for carrying out method 800 and the rest of the methods included herein may be executed by the controller based on instructions stored on a memory of the controller and in conjunction with signals received from sensors of the engine system, such as the sensors described above with reference to FIGS. 1A-3. The controller may employ driveline actuators such as electric machine (e.g. 120), engine torque actuator(s) (e.g. 204), first clutch actuator (e.g. 389), second clutch actuator (e.g. 387), etc., according to the method depicted below.

It may be understood that method 800 is substantially equivalent to method 600 (and method 700), with minor exceptions. Steps 805 through step 835 are the same as that already described for method 600 (and method 700). Thus, for brevity, the steps of method 800 that are the same as method 600 (and method 700) will not be reiterated here, with the understanding that all aspects of method 800 through step 835 may be accomplished as described above with regard to steps 605-635 of method 600 (and steps 705-735 of method 700).

Thus, as described above, at step 835 method 800 may include determining a transmission input electric motor torque command. Such a determination may be made via the vehicle controller obtaining a difference between the simulated turbine torque (desired total gearbox input torque) and the simulated impeller torque (engine torque absorbed by the gearbox).

Proceeding to step 840, method 800 may include multiplying the transmission input electric motor torque command obtained at step 835, by a transmission gearbox torque multiplication ratio. More specifically, because an electric machine (e.g. 120) downstream of the transmission gearbox is being utilized to provide torque in addition to the engine, a transmission output electric machine torque command may additionally include the torque multiplication ratio of the gearbox. Accordingly, at step 840, method 800 may include multiplying the transmission input electric motor torque command by the transmission gearbox torque multiplication ratio, to obtain the transmission output electric machine torque command.

Proceeding to step 845, method 800 may include obtaining a launch clutch torque command. It may be understood that, at step 640 of method 600, the launch clutch torque command was illustrated to be obtained by summing the electric motor torque command and the simulated impeller torque. However, as discussed, the electric motor torque command and the simulated impeller torque is summed for method 600 because the launch clutch (e.g. 126, 127) may be requested to carry the additional torque capacity in excess of engine torque, to transmit both the engine and electric motor torque without inducing undesirable clutch slip, or changing the load on the engine.

Alternatively, method 800 depicts an example where the electric machine (e.g. 120) used to provide the additional torque capacity in excess of engine torque, is downstream of the DCT clutches (e.g. 126, 127), and downstream of the gearbox (e.g. 128). Thus, the launch clutches need not carry additional torque provided via the electric machine. Accordingly, at step 845, obtaining the launch clutch torque command may include obtaining the simulated impeller torque (engine torque absorbed by the gearbox) that was determined at step 825, and designating the launch clutch torque command to be equivalent to the simulated impeller torque.

Proceeding to 850, method 800 may include the vehicle controller sending a command to the electric machine (e.g. 120), actuating the electric machine to produce the torque command determined at step 840 of method 800. Furthermore, at 850, method 800 may include the vehicle controller sending a command to an actuator of the launch clutch (e.g. clutch responsible for transmitting engine/motor torque through the transmission during the vehicle launch procedure). As an example, a command from the vehicle controller may be sent to a first clutch actuator (e.g. 389), such that first clutch valve (e.g. 389A) may be controlled (e.g. duty cycled) to control an amount of fluid flow to first clutch (e.g. 302), thus controlling a torque capacity of the first clutch. In another example, a command from the vehicle controller may be sent to a second clutch actuator (e.g. 387), such that second clutch valve (e.g. 387A) may be controlled (e.g. duty cycled) to control an amount of fluid flow to second clutch (e.g. 304), thus controlling a torque capacity of the second clutch. In either case, it may be understood that the amount of fluid flow (e.g. amount of pressure) supplied to the first clutch or second clutch may comprise an amount of fluid flow to generate a torque capacity equal to that determined at step 845. In other words, the launch clutch torque command determined at step 845 may be sent to the appropriate clutch, such that the appropriate clutch produces the determined amount of launch clutch torque at step 850. Method 800 may then end.

Thus, the methods of FIGS. 6-8 may enable a method comprising controlling a capacity of a clutch configured to transmit torque between an engine and a transmission, and an output of an electric motor positioned in a driveline of the hybrid vehicle during a vehicle launch to emulate a performance of a torque converter positioned in the driveline of the hybrid vehicle, under conditions where the hybrid vehicle does not include the torque converter. In one example of the method, the transmission comprises a dual clutch transmission.

As one example, emulating the performance of the torque converter may further comprise using a model of the clutch and the electric motor. The model may comprise denoting a portion of the driveline upstream of the clutch as an impeller of the torque converter. The model may further comprise denoting another portion of the driveline downstream of the clutch as a turbine of the torque converter.

As one example of the method, the model may include defining a simulated impeller input torque as a ratio of an impeller speed squared to a k-factor squared, defining a simulated turbine output torque as the impeller input torque multiplied by a torque ratio, where both the k-factor and the torque ratio are defined as one of either a constant, a function of a slip speed of the clutch, or other parameter. In such an example, a measured crankshaft speed of a crankshaft mechanically coupled to the engine may be used as the impeller speed in the model and an input shaft speed of a transmission input shaft selectively mechanically coupled to the transmission may be used as a turbine speed of the torque converter. In such an example, the k-factor and the torque ratio may be a function of a ratio between the input shaft speed and the crankshaft speed.

In such a method, controlling the output of the electric motor may further comprise obtaining an electric motor torque command via a difference between the simulated impeller input torque and the simulated turbine output torque. In one example where the electric motor is positioned in the driveline upstream of the clutch, controlling the capacity of the clutch may be a function of a sum of the electric motor torque command and the simulated impeller input torque. In another example where the electric motor is positioned in the driveline between the clutch and the transmission, controlling the capacity of the clutch may not include summing the electric motor torque command and the simulated impeller input torque. In still another example where the electric motor is positioned in the driveline downstream of the transmission, controlling the capacity of the clutch may be a function of the simulated impeller input torque (but not directly the electric motor torque command) and the electric motor torque command may be a function of a torque ratio of the transmission.

In some examples of such a method, controlling capacity of the clutch may further comprise slipping the clutch.

Another example of a method includes a driveline operating method for a controlling an electric motor and a clutch that transmits torque between an engine and a transmission during a vehicle launch, comprising:

(a) using a model of the clutch and the electric motor that includes relationships of a speed of a crankshaft mechanically coupled to the engine and an input shaft speed of a transmission input shaft to determine a capacity of the clutch and an output of the electric motor; and (b) controlling the clutch to a desired capacity and the output of the electric motor to a desired output based on the model.

In such a method, the model may denote the speed of the crankshaft as an impeller speed corresponding to a torque converter, and further includes denoting the input shaft speed as a turbine speed of the torque converter. The model may represent a k-factor and a torque ratio as one of either a constant, a function of a slip speed of the clutch, or other parameter. The model may simulate impeller input torque as a ratio of the impeller speed squared to the k-factor squared, and may simulate turbine output torque as the impeller input torque multiplied by the torque ratio. Furthermore, in such a method, controlling the output of the electric motor may further comprise obtaining an electric motor torque command via a difference between the simulated impeller input torque and the simulated turbine output torque.

In such a method, the electric motor may be positioned in the driveline upstream of the clutch, and wherein controlling the capacity of the clutch may be a function of a sum of the electric motor torque command and the simulated impeller input torque. In such an example, the clutch may carry torque from the engine and the electric motor without inducing a clutch slip greater than a desired clutch slip and/or without changing a load of the engine.

In such a method, the electric motor may be positioned in the driveline between the clutch and the transmission. In such an example, controlling the capacity of the clutch may not include summing the electric motor torque command and the simulated impeller input torque. In such an example a torque multiplication torque may be commanded to the electric motor.

Furthermore, in such a method, the electric motor may be positioned in the driveline downstream of the transmission. In such an example, controlling the capacity of the clutch may be a function of the simulated impeller input torque and the electric motor torque command may further be a function of a torque ratio of the transmission.

Figure 9:
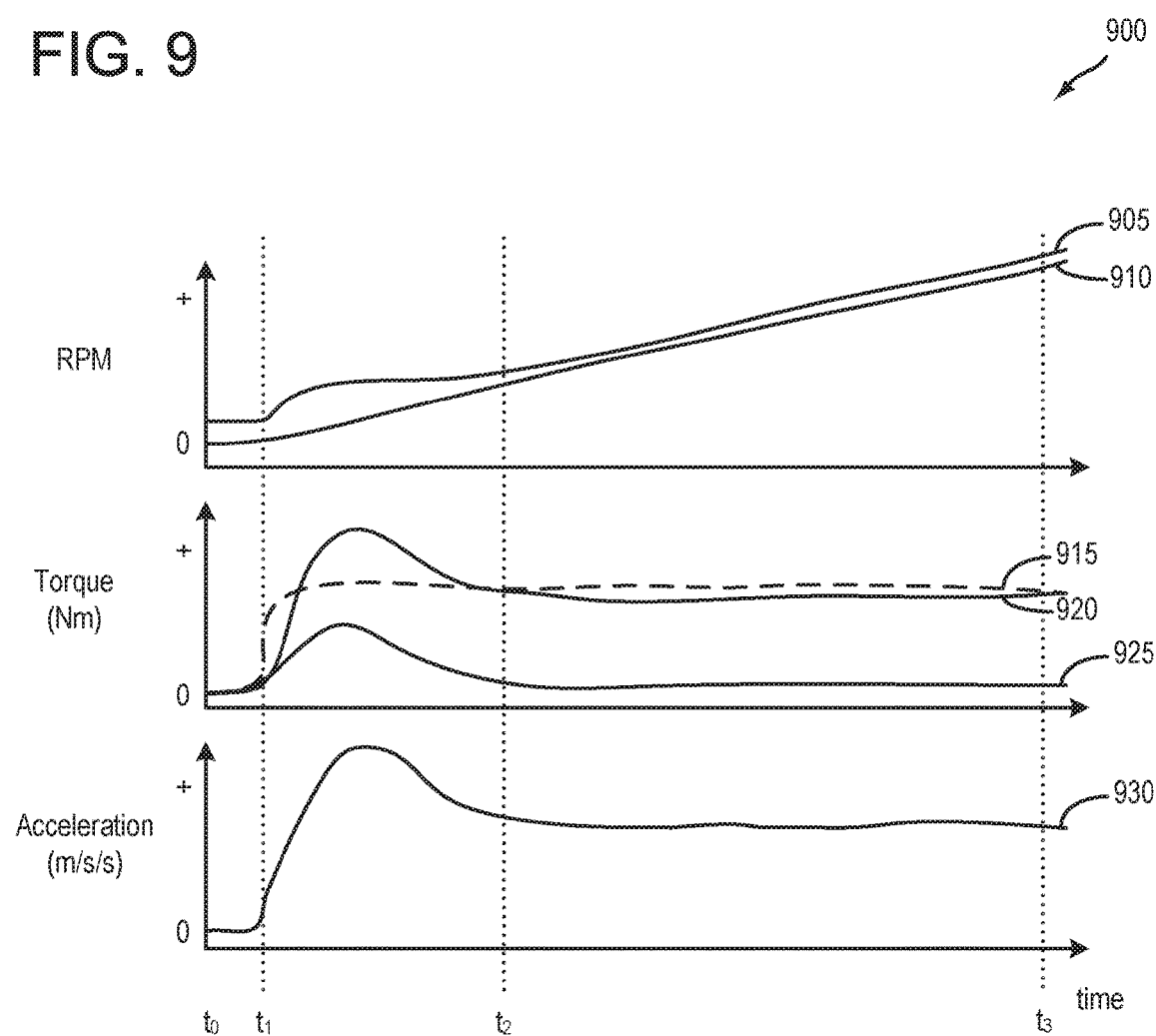
FIG. 9 shows an example timeline for a controlling a hybrid powertrain during a vehicle launch procedure, where a launch clutch may tolerate continuous slippage subsequent to the vehicle launch.

Turning now to FIG. 9, an example timeline 900 is shown for controlling a hybrid powertrain, such as hybrid powertrain 200 depicted above at FIG. 2, to emulate the performance of a vehicle with a torque converter during a vehicle launch procedure. More specifically, timeline 900 illustrates an example where an electric motor upstream of the DCT clutches, for example BISG (e.g. 142) or CISG (e.g. 297) is utilized to provide torque in addition to the engine. To control the hybrid powertrain, the method detailed in FIG. 6, along with the block diagram illustrated at FIG. 5A, may be utilized, as discussed in detail above. In other words, the algorithms laid out above in the block diagram illustrated at FIG. 5A and the method of FIG. 6 may be utilized to control the hybrid powertrain to emulate the performance of a torque converter in the powertrain.

Timeline 900 includes plot 905, indicating an engine speed (RPM), over time. Timeline 900 further includes plot 910, indicating a speed (RPM) of a transmission input shaft (e.g. 302, 304), over time. It may be understood that the transmission input shaft depicted at FIG. 9 refers to a transmission shaft responsible for transferring engine (and motor) torque through the transmission during the vehicle launch event. Engine speed, and transmission input shaft speed may be at 0 RPM, or greater (+) than 0 RPM, for example. Timeline 900 further includes plot 915, indicating an engine torque (N·m), over time. Timeline 900 further includes plot 920 indicating a torque capacity (N·m) of a launch clutch (e.g. 126, 127), over time. It may be understood that the launch clutch depicted at FIG. 9 comprises a clutch (e.g. 126, 127) responsible for transferring engine (and motor) torque through the transmission during the vehicle launch event. Timeline 900 further includes plot 925, indicating a torque output (N·m) of an integrated starter/generator (e.g. BISG 142 or CISG 297), over time. For simplicity, in example timeline 900 it may be understood that plot 925 refers to a BISG (e.g. 142). For each of plots 915, 920, and 925, torque may be at 0 N·m, or may be greater than (+) 0 N·m. Timeline 900 further includes plot 930, indicating vehicle acceleration (m/s/s), over time. Acceleration may be 0 m/s/s, or greater than (+) 0 m/s/s.

At time t0, the engine is at an idle speed, indicated by plot 905, and transmission input shaft speed is at zero RPM, indicated by plot 910. Accordingly, the engine is not producing substantial torque, indicated by plot 915. The BISG is off, and is thus not producing any torque, indicated by plot 925. Furthermore, it may be understood that the launch clutch of the DCT is open, indicated by plot 920. More specifically, the torque capacity of the DCT launch clutch is indicated to be zero, thus indicating that the launch clutch is fully open. Accordingly, the vehicle is not indicated to be accelerating at time t0.

At time t1, the vehicle operator steps into an accelerator pedal (e.g. 192), requesting an increase in wheel torque. Accordingly, between time t1 and t2, engine torque is indicated to increase and plateau, indicated by plot 915, and engine speed increases accordingly, indicated by plot 905.

Responsive to the request for vehicle acceleration, components of the hybrid powertrain may be controlled to emulate the performance of a vehicle with a torque converter. Specifically, method 600 depicted at FIG. 6 may be used to control the hybrid powertrain as depicted in timeline 900.

Accordingly, between time t1 and t2, crankshaft speed may be monitored, along with speed of the transmission input shaft (indicated by plot 910). The ratio of transmission input shaft speed to crankshaft speed may be utilized to lookup a k-factor and a transmission torque ratio, as discussed above with regard to the block diagram depicted at FIG. 5A, and with regard to the method of FIG. 6. Based on the indicated crankshaft speed, and indicated k-factor, a simulated torque converter impeller torque may be determined, which corresponds to an amount of engine torque absorbed by the gearbox (e.g. 128), via the use of equation (1) depicted above. The simulated torque converter impeller torque (engine torque absorbed by the gearbox) may thus be multiplied by the transmission torque ratio, to obtain a simulated turbine torque, corresponding to a desired total gearbox input torque, via the use of equation (2) depicted above. The difference between the simulated turbine torque (desired total gearbox input torque), and simulated impeller torque (engine torque absorbed by the gearbox) may thus comprise a transmission input electric motor (BISG) torque command. Because the BISG is upstream of the clutches of the DCT, the launch clutch thus may carry both the engine torque and the torque from the BISG. Accordingly, the transmission input electric motor (BISG) torque command may be added to the simulated impeller torque (engine torque absorbed by the gearbox), to obtain a launch clutch torque command. As discussed at FIG. 5A and FIG. 6, transmission input shaft speed may comprise a feedback parameter, thus it may be understood that the methodology described above may continually take place during the vehicle launch, to coordinate launch clutch torque capacity with engine torque and electric motor (BISG) torque.

Thus, between time t1 and t2, as BISG torque increases, launch clutch torque capacity increases accordingly. Launch clutch torque capacity is illustrated to rise to an amount greater than engine torque, as the launch clutch may absorb both engine torque and BISG torque.

At time t2, the vehicle launch phase is concluded, as engine speed and transmission input shaft speed are within a predetermined threshold of each other. For example, the predetermined threshold may comprise engine speed and transmission input shaft speed differing by 5% or less of each other.

Between time t2 and t3, the algorithm described above with regard to the block diagram at FIG. 5A, and the method depicted at FIG. 6, may be continued to control the launch clutch to slip, and the algorithm may be continued to simulate torque converter behavior for smooth acceleration performance and driveline disturbance isolation. It may be understood that such an example implies that the launch clutch is capable of dissipating heat generated by the extended launch clutch slip.

Thus, example timeline 900 illustrates an example where the vehicle launch algorithm as discussed above with regard to FIG. 5A and FIG. 6 is run for the vehicle, where torque multiplication is provided via the BISG, under conditions where the engine is producing constant torque during the vehicle launch procedure.

While not explicitly shown, similar results may be achieved with a transmission output side electric machine (e.g. 120), or an electric motor (e.g. 298) positioned between the DCT clutches and the transmission gearbox.

As discussed above with regard to FIG. 9, timeline 900 illustrates an example where the launch clutch is capable of dissipating heat generated by an extended launch clutch slippage. In a condition where the launch clutch cannot tolerate continuous slip, the launch clutch may need to be locked, as will be discussed in further detail below with regard to FIG. 10.

Figure 10:
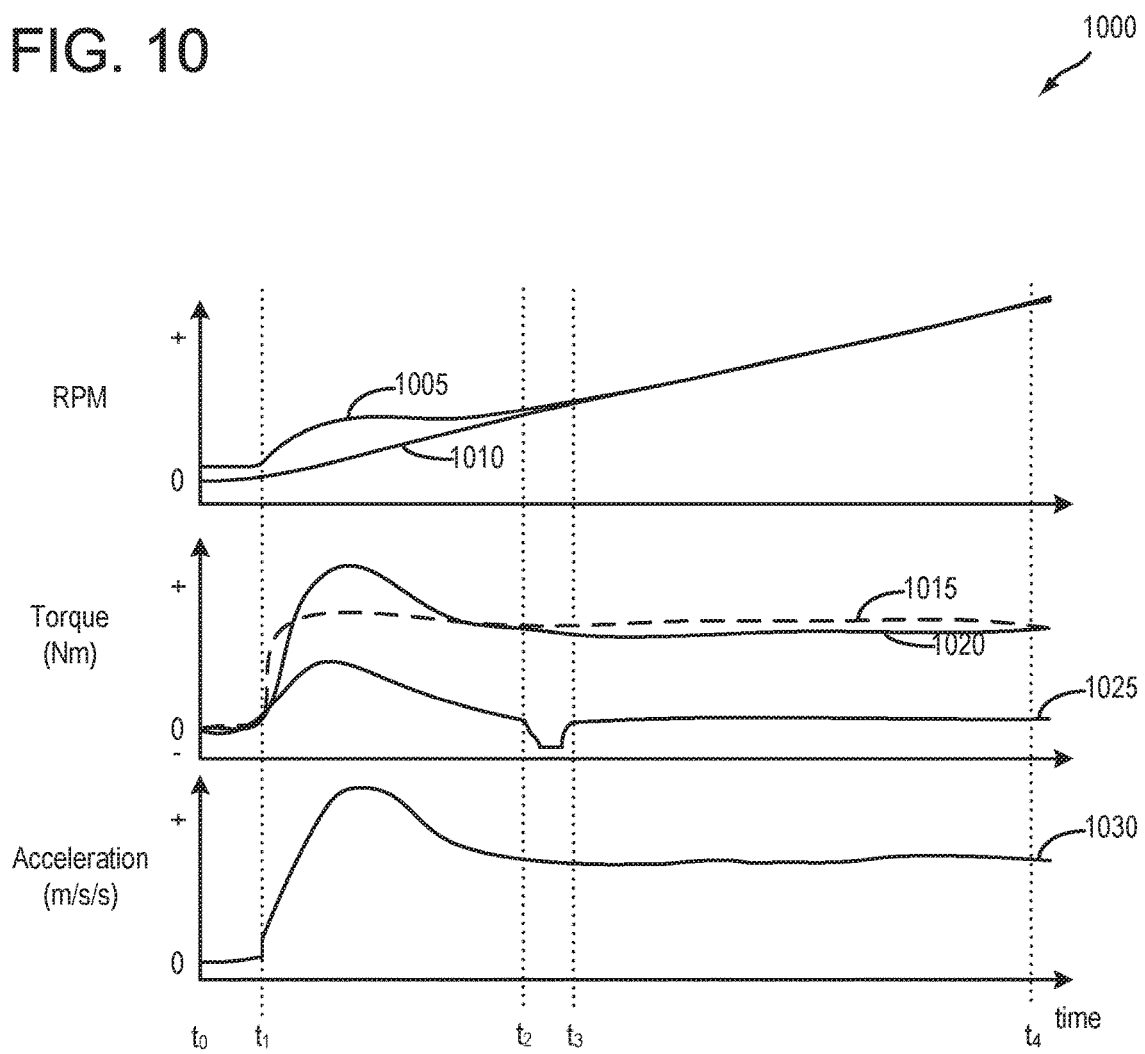
FIG. 10 shows an example timeline for controlling a hybrid powertrain during a vehicle launch procedure, where a launch clutch may not be capable of tolerating continuous slippage subsequent to the vehicle launch.

Turning now to FIG. 10, an example timeline 1000 is shown for controlling a hybrid powertrain, such as hybrid powertrain 200 depicted above at FIG. 2, to emulate the performance of a vehicle with a torque converter during a vehicle launch procedure. More specifically, timeline 1000 illustrates an example where an electric motor upstream of the DCT clutches, for example BISG (e.g. 142) or CISG (e.g. 297) is utilized to provide torque in addition to the engine. To control the hybrid powertrain, the method detailed in FIG. 6, along with the block diagram illustrated at FIG. 5A, may be utilized, as discussed in detail above. In other words, the algorithms laid out above in the block diagram illustrated at FIG. 5A and the method of FIG. 6 may be utilized to control the hybrid powertrain to emulate the performance of a torque converter in the powertrain. Timeline 1000 differs from timeline 900 in that a launch clutch depicted at FIG. 9 is capable of tolerating continuous slip after the vehicle launch phase is complete, whereas the launch clutch depicted at FIG. 10 is not capable of tolerating continuous slip after the vehicle launch phase is complete, as will be discussed in detail below.

Timeline 1000 includes plot 1005, indicating an engine speed (RPM), over time. Timeline 1000 further includes plot 1010, indicating a speed (RPM) of a transmission input shaft (e.g. 302, 304), over time. It may be understood that the transmission input shaft depicted at FIG. 10 refers to a transmission shaft responsible for transferring engine (and motor) torque through the transmission during the vehicle launch event. Engine speed, and transmission input shaft speed may be at 0 RPM, or greater (+) than 0 RPM, for example. Timeline 1000 further includes plot 1015, indicating an engine torque (N·m), over time. Timeline 1000 further includes plot 1020 indicating a torque capacity (N·m) of a launch clutch (e.g. 126, 127), over time. It may be understood that the launch clutch depicted at FIG. 10 comprises a clutch (e.g. 126, 127) responsible for transferring engine (and motor) torque through the transmission during the vehicle launch event. Timeline 1000 further includes plot 1025, indicating a torque output (N·m) of an integrated starter/generator (e.g. BISG 142 or CISG 297), over time. For simplicity, in example timeline 1000 it may be understood that plot 1025 refers to a BISG (e.g. 142). For each of plots 1015, 1020, and 1025, torque may be at 0 N·m, or may be greater than (+) or less than (−) 0 N·m. Timeline 1000 further includes plot 1030, indicating vehicle acceleration (m/s/s), over time. Acceleration may be 0 m/s/s, or greater than (+) 0 m/s/s.

It may be understood that many aspects of timeline 1000 are similar to those depicted in timeline 900. However, for clarity, those aspects that are the same will be briefly reiterated below.

At time t0, the engine is at an idle speed, indicated by plot 1005, and transmission input shaft speed is at zero RPM, indicated by plot 910. Accordingly, the engine is not producing substantial torque, indicated by plot 1015. The BISG is off, and is thus not producing any torque, indicated by plot 1025. Furthermore, it may be understood that the launch clutch of the DCT is open, indicated by plot 1020. More specifically, the torque capacity of the DCT launch clutch is indicated to be zero, thus indicating that the launch clutch is fully open. Accordingly, the vehicle is not indicated to be accelerating at time t0.

At time t1, the vehicle operator steps into an accelerator pedal (e.g. 192), requesting an increase in wheel torque. Accordingly, between time t1 and t2, engine torque is indicated to increase and plateau, indicated by plot 1015, and engine speed increases accordingly, indicated by plot 1005.

Responsive to the request for vehicle acceleration, components of the hybrid powertrain may be controlled to emulate the performance of a vehicle with a torque converter. Specifically, method 600 depicted at FIG. 6 may be used to control the hybrid powertrain as depicted in timeline 1000.

Accordingly, between time t1 and t2, crankshaft speed may be monitored, along with speed of the transmission input shaft (indicated by plot 1010). The ratio of transmission input shaft speed to crankshaft speed may be utilized to lookup a k-factor and a transmission torque ratio, as discussed above with regard to the block diagram depicted at FIG. 5A, and with regard to the method of FIG. 6. Based on the indicated crankshaft speed, and indicated k-factor, a simulated torque converter impeller torque may be determined, which corresponds to an amount of engine torque absorbed by the gearbox (e.g. 128), via the use of equation (1) depicted above. The simulated torque converter impeller torque (engine torque absorbed by the gearbox) may thus be multiplied by the transmission torque ratio, to obtain a simulated turbine torque, corresponding to a desired total gearbox input torque, via the use of equation (2) depicted above. The difference between the simulated turbine torque (desired total gearbox input torque), and simulated impeller torque (engine torque absorbed by the gearbox) may thus comprise a transmission input electric motor (BISG) torque command. Because the BISG is upstream of the clutches of the DCT, the launch clutch thus may carry both the engine torque and the torque from the BISG. Accordingly, the transmission input electric motor (BISG) torque command may be added to the simulated impeller torque (engine torque absorbed by the gearbox), to obtain a launch clutch torque command. As discussed at FIG. 5A and FIG. 6, transmission input shaft speed may comprise a feedback parameter, thus it may be understood that the methodology described above may continually take place during the vehicle launch, to coordinate launch clutch torque capacity with engine torque and electric motor (BISG) torque.

Thus, between time t1 and t2, as BISG torque increases, launch clutch torque capacity increases accordingly. Launch clutch torque capacity is illustrated to rise to an amount greater than engine torque, as the launch clutch may absorb both engine torque and BISG torque.

At time t2, engine speed and transmission input shaft speed are indicated to be within a predetermined threshold of each other, for example, both speeds may be within 5% of each other or less. However, example timeline 1000 depicts an example where the launch clutch is not capable of tolerating continuous slip. Thus, the launch clutch may need to be locked (e.g. torque capacity of the launch clutch such that the clutch does not undergo slippage). Accordingly, between time t2 and t3, the BISG is commanded to produce a negative torque, to slow engine speed down such that the engine speed and the transmission input shaft speed may be matched. In such an example, engine torque and launch clutch torque are held constant, as indicated in timeline 1000.

Thus, between time t2 and t3, the launch clutch is locked. Responsive to the launch clutch being locked, where torque capacity of the launch clutch is such that the clutch does not undergo slippage, the ISG torque is reduced to zero torque. With the launch clutch locked, it may be understood that between time t3 and t4, the vehicle is driven with only engine torque transmitted through the locked launch clutch. In such an example, responsive to the clutch being locked, the BISG may be utilized for inertia compensation to smooth driveline oscillations. However, it the example timeline 1000, the BISG remains off while the vehicle is driven with engine torque transmitted through the locked clutch.

Thus, example timeline 1000 illustrates an example where the vehicle launch algorithm as discussed above with regard to FIG. 5A and FIG. 6 is run for the vehicle, where torque multiplication is provided via the BISG, under conditions where the engine is producing constant torque during the vehicle launch procedure.

While not explicitly shown, similar results may be achieved with a transmission output side electric machine (e.g. 120).

In this way, for vehicles not equipped with a torque converter, vehicle launch may mimic behavior expected or desired via vehicle operators used to the feel of a vehicle that includes a torque converter in the driveline. By closely mimicking such behavior in vehicles without a torque converter, customer satisfaction may be improved.

The technical effect is to recognize that equations for torque converter control may be adapted in order to model a drivetrain with an engine, electric motor, transmission, and one or more clutches configured to transfer engine torque from the engine to one or more driven wheels. Specifically, a technical effect is to recognize that a crankshaft speed may be defined as an impeller speed, and a transmission input shaft speed may be defined as a turbine speed, such that equations for a torque converter may be adapted for a vehicle without the torque converter. Another technical effect is to recognize that torque multiplication may be provided via an electric motor/machine.

The systems described herein, and with regard to the systems of FIGS. 1A-3, along with the methods depicted herein, and described in conjunction with the method of FIGS. 5A-8, may enable one or more systems and one or more methods. In one example, a method for a hybrid vehicle comprises controlling a capacity of a clutch configured to transmit torque between an engine and a transmission, and an output of an electric motor positioned in a driveline of the hybrid vehicle during a vehicle launch to emulate a performance of a torque converter positioned in the driveline of the hybrid vehicle, under conditions where the hybrid vehicle does not include the torque converter. In a first example of the method, the transmission comprises a dual clutch transmission. A second example of the method optionally includes the first example, and further includes wherein emulating the performance of the torque converter further comprises using a model of the clutch and the electric motor that includes denoting a portion of the driveline upstream of the clutch as an impeller of the torque converter, and further includes denoting a portion of the driveline downstream of the clutch as a turbine of the torque converter. A third example of the method optionally includes any one or more or each of the first through second examples, and further includes wherein the model includes defining a simulated impeller input torque as a ratio of an impeller speed squared to a k-factor squared, defining a simulated turbine output torque as the impeller input torque multiplied by a torque ratio, where both the k-factor and the torque ratio are defined as one of either a constant, a function of a slip speed of the clutch, or other parameter; wherein a measured speed of a crankshaft mechanically coupled to the engine is used as the impeller speed in the model and wherein an input shaft speed of a transmission input shaft selectively mechanically coupled to the transmission is used as a turbine speed of the torque converter; and wherein the k-factor and the torque ratio are a function of a ratio between the input shaft speed and the crankshaft speed. A fourth example of the method optionally includes any one or more or each of the first through third examples, and further includes wherein controlling the output of the electric motor further comprises obtaining an electric motor torque command via a difference between the simulated impeller input torque and the simulated turbine output torque. A fifth example of the method optionally includes any one or more or each of the first through fourth examples, and further includes wherein the electric motor is positioned in the driveline upstream of the clutch, and wherein controlling the capacity of the clutch is a function of a sum of the electric motor torque command and the simulated impeller input torque. A sixth example of the method optionally includes any one or more or each of the first through fifth examples, and further includes wherein the electric motor is positioned in the driveline between the clutch and the transmission, and wherein controlling the capacity of the clutch does not include summing the electric motor torque command and the simulated impeller input torque. A seventh example of the method optionally includes any one or more or each of the first through sixth examples, and further includes wherein the electric motor is positioned in the driveline downstream of the transmissions, and wherein controlling the capacity of the clutch is a function of the simulated impeller input torque but not the electric motor torque command, but where the electric motor torque command is further a function of a torque ratio of the transmission. An eighth example of the method optionally includes any one or more or each of the first through seventh examples, and further includes wherein controlling the capacity of the clutch further comprises slipping the clutch.

An example of a system for a vehicle comprises an engine including a crankshaft mechanically coupled to the engine; a transmission positioned in a driveline downstream of the engine, the transmission configured with at least a clutch configured to transmit engine torque to one or more wheels via the transmission; one or more transmission input shafts; an electric motor positioned in the driveline; and a controller, storing instructions in non-transitory memory that, when executed, cause the controller to: control a capacity of the clutch and an output of the electric motor via a model that simulates a torque converter in the driveline, the model including denoting a portion of the driveline upstream of the clutch as an impeller of the torque converter and denoting another portion of the driveline downstream of the clutch as a turbine of the torque converter, where the model includes defining a simulated impeller input torque as a ratio of an impeller speed squared to a k-factor squared, defining a simulated turbine output torque as the impeller input torque multiplied by a torque ratio, where both the k-factor and the torque ratio are defined as one of either a constant, a function of a slip speed of the clutch, or other parameter; wherein a measured speed of the crankshaft mechanically coupled to the engine is used as the impeller speed in the model and wherein an input shaft speed of a transmission input shaft of the one or more transmission input shafts is used as a turbine speed of the torque converter; and wherein the k-factor and the torque ratio are a function of a ratio between the input shaft speed and the crankshaft speed. In a first example of the system, the system further includes wherein the controller stores further instructions to control the output of the electric motor via a difference between the simulated impeller input torque and the simulated turbine output torque. A second example of the system optionally includes the first example, and further includes wherein the electric motor is positioned in the driveline upstream of the clutch, and where controlling the capacity of the clutch is a function of a sum of the electric motor torque command and the simulated impeller input torque. A third example of the system optionally includes any one or more or each of the first through second examples, and further includes wherein the electric motor is positioned in the driveline between the clutch and the transmission, and wherein controlling the capacity of the clutch does not include summing the electric motor torque command and the simulated impeller input torque; and wherein a torque multiplication torque is included in the electric motor torque. A fourth example of the system optionally includes any one or more or each of the first through third examples, and further includes wherein the electric motor is positioned downstream of the transmission, and where controlling the capacity of the clutch is a function of the simulated impeller input torque, and where the electric motor torque command is further a function of a torque ratio of the transmission. A fifth example of the system optionally includes any one or more or each of the first through fourth examples, and further includes wherein the transmission further comprises a dual clutch transmission.

Another example of a method includes a driveline operating method for a controlling an electric motor and a clutch that transmits torque between an engine and a transmission during a vehicle launch, comprising:

(a) using a model of the clutch and the electric motor that includes relationships of a speed of a crankshaft mechanically coupled to the engine and an input shaft speed of a transmission input shaft to determine a capacity of the clutch and an output of the electric motor; and (b) controlling the clutch to a desired capacity and the output of the electric motor to a desired output based on the model.

In a first example of the method, the method further includes wherein the model denotes the speed of the crankshaft as an impeller speed corresponding to a torque converter, and further includes denoting the input shaft speed as a turbine speed of the torque converter; wherein the model represents a k-factor and a torque ratio as one of either a constant, a function of a slip speed of the clutch, or other parameter; wherein the model simulates impeller input torque as a ratio of the impeller speed squared to the k-factor squared, and simulates turbine output torque as the impeller input torque multiplied by the torque ratio; and wherein controlling the output of the electric motor further comprises obtaining an electric motor torque command via a difference between the simulated impeller input torque and the simulated turbine output torque. A second example of the method optionally includes the first example, and further includes wherein the electric motor is positioned in the driveline upstream of the clutch, and wherein controlling the capacity of the clutch is a function of a sum of the electric motor torque command and the simulated impeller input torque; and wherein the clutch carries torque from the engine and the electric motor without inducing a clutch slip greater than a desired clutch slip and/or without changing a load of the engine. A third example of the method optionally includes any one or more or each of the first and second examples, and further includes wherein the electric motor is positioned in the driveline between the clutch and the transmission, and wherein controlling the capacity of the clutch does not include summing the electric motor torque command and the simulated impeller input torque; and wherein a torque multiplication torque is commanded to the electric motor. A fourth example of the method optionally includes any one or more or each of the first through third examples, and further includes wherein the electric motor is positioned in the driveline downstream of the transmission, and wherein controlling the capacity of the clutch is a function of the simulated impeller input torque and where the electric motor torque command is further a function of a torque ratio of the transmission.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a hybrid vehicle comprising:
controlling a capacity of a clutch configured to transmit torque between an engine and a transmission, and an output of an electric motor positioned in a driveline of the hybrid vehicle during a vehicle launch to emulate a performance of a torque converter positioned in the driveline of the hybrid vehicle, under conditions where the hybrid vehicle does not include the torque converter.

2. The method of claim 1, wherein the transmission comprises a dual clutch transmission.

3. The method of claim 1, wherein emulating the performance of the torque converter further comprises using a model of the clutch and the electric motor that includes denoting a portion of the driveline upstream of the clutch as an impeller of the torque converter, and further includes denoting a portion of the driveline downstream of the clutch as a turbine of the torque converter.

4. The method of claim 3, wherein the model includes defining a simulated impeller input torque as a ratio of an impeller speed squared to a k-factor squared, defining a simulated turbine output torque as the impeller input torque multiplied by a torque ratio, where both the k-factor and the torque ratio are defined as one of either a constant, a function of a slip speed of the clutch, or other parameter;
wherein a measured speed of a crankshaft mechanically coupled to the engine is used as the impeller speed in the model and wherein an input shaft speed of a transmission input shaft selectively mechanically coupled to the transmission is used as a turbine speed of the torque converter; and
wherein the k-factor and the torque ratio are a function of a ratio between the input shaft speed and the crankshaft speed.

5. The method of claim 4, wherein controlling the output of the electric motor further comprises obtaining an electric motor torque command via a difference between the simulated impeller input torque and the simulated turbine output torque.

6. The method of claim 5, wherein the electric motor is positioned in the driveline upstream of the clutch, and wherein controlling the capacity of the clutch is a function of a sum of the electric motor torque command and the simulated impeller input torque.

7. The method of claim 5, wherein the electric motor is positioned in the driveline between the clutch and the transmission, and wherein controlling the capacity of the clutch does not include summing the electric motor torque command and the simulated impeller input torque.

8. The method of claim 5, wherein the electric motor is positioned in the driveline downstream of the transmissions, and wherein controlling the capacity of the clutch is a function of the simulated impeller input torque but not the electric motor torque command, but where the electric motor torque command is further a function of a torque ratio of the transmission.

9. The method of claim 1, wherein controlling the capacity of the clutch further comprises slipping the clutch.

10. A system for a vehicle, comprising:
an engine including a crankshaft mechanically coupled to the engine;
a transmission positioned in a driveline downstream of the engine, the transmission configured with at least a clutch configured to transmit engine torque to one or more wheels via the transmission;
one or more transmission input shafts;
an electric motor positioned in the driveline;
and a controller, storing instructions in non-transitory memory that, when executed, cause the controller to:
control a capacity of the clutch and an output of the electric motor via a model that simulates a torque converter in the driveline, the model including denoting a portion of the driveline upstream of the clutch as an impeller of the torque converter and denoting another portion of the driveline downstream of the clutch as a turbine of the torque converter, where the model includes defining a simulated impeller input torque as a ratio of an impeller speed squared to a k-factor squared, defining a simulated turbine output torque as the impeller input torque multiplied by a torque ratio, where both the k-factor and the torque ratio are defined as one of either a constant, a function of a slip speed of the clutch, or other parameter;
wherein a measured speed of the crankshaft mechanically coupled to the engine is used as the impeller speed in the model and wherein an input shaft speed of a transmission input shaft of the one or more transmission input shafts is used as a turbine speed of the torque converter; and
wherein the k-factor and the torque ratio are a function of a ratio between the input shaft speed and the crankshaft speed.

11. The system of claim 10, wherein the controller stores further instructions to control the output of the electric motor via a difference between the simulated impeller input torque and the simulated turbine output torque.

12. The system of claim 11, wherein the electric motor is positioned in the driveline upstream of the clutch, and where controlling the capacity of the clutch is a function of a sum of the electric motor torque command and the simulated impeller input torque.

13. The system of claim 11, wherein the electric motor is positioned in the driveline between the clutch and the transmission, and wherein controlling the capacity of the clutch does not include summing the electric motor torque command and the simulated impeller input torque; and
wherein a torque multiplication torque is included in the electric motor torque.

14. The system of claim 11, wherein the electric motor is positioned downstream of the transmission, and where controlling the capacity of the clutch is a function of the simulated impeller input torque, and where the electric motor torque command is further a function of a torque ratio of the transmission.

15. The system of claim 10, wherein the transmission further comprises a dual clutch transmission.

16. A driveline operating method for a controlling an electric motor and a clutch that transmits torque between an engine and a transmission during a vehicle launch, comprising:
(a) using a model of the clutch and the electric motor that includes relationships of a speed of a crankshaft mechanically coupled to the engine and an input shaft speed of a transmission input shaft to determine a capacity of the clutch and an output of the electric motor; and
(b) controlling the clutch to a desired capacity and the output of the electric motor to a desired output based on the model.

17. The method of claim 16, wherein the model denotes the speed of the crankshaft as an impeller speed corresponding to a torque converter, and further includes denoting the input shaft speed as a turbine speed of the torque converter;
wherein the model represents a k-factor and a torque ratio as one of either a constant, a function of a slip speed of the clutch, or other parameter;
wherein the model simulates impeller input torque as a ratio of the impeller speed squared to the k-factor squared, and simulates turbine output torque as the impeller input torque multiplied by the torque ratio; and
wherein controlling the output of the electric motor further comprises obtaining an electric motor torque command via a difference between the simulated impeller input torque and the simulated turbine output torque.

18. The method of claim 17, wherein the electric motor is positioned in the driveline upstream of the clutch, and wherein controlling the capacity of the clutch is a function of a sum of the electric motor torque command and the simulated impeller input torque; and
wherein the clutch carries torque from the engine and the electric motor without inducing a clutch slip greater than a desired clutch slip and/or without changing a load of the engine.

19. The method of claim 17, wherein the electric motor is positioned in the driveline between the clutch and the transmission, and wherein controlling the capacity of the clutch does not include summing the electric motor torque command and the simulated impeller input torque; and
wherein a torque multiplication torque is commanded to the electric motor.

20. The method of claim 17, wherein the electric motor is positioned in the driveline downstream of the transmission, and wherein controlling the capacity of the clutch is a function of the simulated impeller input torque and where the electric motor torque command is further a function of a torque ratio of the transmission.

* * * * *